US011157855B2

(12) United States Patent
Parimelazhagan et al.

(10) Patent No.: US 11,157,855 B2
(45) Date of Patent: Oct. 26, 2021

(54) ROBOTICS PROCESS AUTOMATION PLATFORM

(71) Applicant: Sutherland Global Services Inc., Pittsford, NY (US)

(72) Inventors: Ganesh Raj Mohan Parimelazhagan, Chennai (IN); Sarfraz Amin Ammanullah, Chennai (IN); Ramalingam Ganesan, Chennai (IN); Mohideen Meera Shahib, Chennai (IN); Vasu Sambandan, Thanjavur (IN); Dhanasekar Velayudham, Chennai (IN); Manu Gopinath, Chennai (IN); Kannan Thirumalai, Chennai (IN); Sivasubramonian Sivathanu Pillai, Chennai (IN); Mohan Kandasamy, Erode (IN); Prabhu Madhu, Krishnagiri (IN); Magendiran Baskar, Vellore (IN)

(73) Assignee: Sutherland Global Services Inc., Pittsford, NY (US)

(*) Notice: Subject to any disclaimer, the term of this patent is extended or adjusted under 35 U.S.C. 154(b) by 768 days.

(21) Appl. No.: 15/401,263

(22) Filed: Jan. 9, 2017

(65) Prior Publication Data
US 2018/0197123 A1    Jul. 12, 2018

(51) Int. Cl.
*G06Q 10/06*    (2012.01)
*G06F 16/951*    (2019.01)

(52) U.S. Cl.
CPC ....... *G06Q 10/0633* (2013.01); *G06F 16/951* (2019.01); *Y10S 901/50* (2013.01)

(58) Field of Classification Search
CPC .. G06Q 10/0633; G06F 16/951; Y10S 901/50
See application file for complete search history.

(56) References Cited

U.S. PATENT DOCUMENTS

2005/0066304 A1* 3/2005 Tattrie .................. G06F 8/20
                                                    717/101
2008/0262875 A1* 10/2008 Plavnik ................ G16H 40/20
                                                    705/3

(Continued)

OTHER PUBLICATIONS

Brown et al, JMS: An Open Source Workflow Management System and Web-Based Cluster Front-End for High Performance Computing, 2015 (Year: 2015).*

*Primary Examiner* — Mohamed N El-Bathy
(74) *Attorney, Agent, or Firm* — Woods Oviatt Gilman LLP; Dennis B. Danella, Esq.

(57) ABSTRACT

A robotics process automation platform for developing and managing a workflow is provided. The platform includes development and operational databases stored in a memory, a development interface component, a control interface component, and a runner component. The development interface component is configured for creating a workflow and storing the workflow in the development database. The control interface component is configured for selecting the workflow stored in the development database and storing a copy of the workflow in the operational database. The runner component is configured for receiving instructions from the control interface component to store a copy of the workflow stored in the operational database in a memory of a virtual computing device, and downloading the workflow in the second memory. The runner component is also configured for instructing the virtual computing device to execute the workflow in association with the target application.

45 Claims, 13 Drawing Sheets

(56) References Cited

U.S. PATENT DOCUMENTS

| | | | | |
|---|---|---|---|---|
| 2012/0117570 A1* | 5/2012 | Ozaki | .................... | G06Q 10/06 |
| | | | | 718/102 |
| 2015/0012919 A1 | 1/2015 | Moss et al. | | |
| 2015/0324338 A1* | 11/2015 | Levy | .................... | G06F 17/211 |
| | | | | 715/244 |
| 2017/0048285 A1* | 2/2017 | Pearl | .................... | H04L 65/403 |
| 2017/0052824 A1* | 2/2017 | Sharma | ................. | G06F 9/4494 |
| 2017/0147190 A1* | 5/2017 | Twist | .................. | G06Q 10/103 |

\* cited by examiner 172
168

```
1        WEBSITE XYZ
2    PRODUCT ORDERING WEBPAGE
3
4   Product Order Number:
5   1234567-1111
6
7   Customer Name:
8   John Doe
9
10  Customer Address:
11  123 Road
12
13  Credit Card Number:
         170
14  [8]9 6 7 4 6 5 5 1 2 3 5 7 8 0 9
15
16
```
174

FIG. 6

ROBOTICS PROCESS AUTOMATION PLATFORM

FIELD OF THE INVENTION

The present invention relates to a robotics process automation platform; in particular, the robotics process automation platform provides a computer environment for developing, deploying, managing and monitoring computer-executable instructions that are configured for performing automated processes within a target computer application.

BACKGROUND OF THE INVENTION

It is common to use computing devices to perform certain tasks or transactions, such as in the creation of documents and records, managing stored data, and ordering goods and services. In many cases the use of computing devices increases the efficiency of performing a given task or transaction, which has contributed to their increased popularity. However, sometimes inefficiencies exist in the back-end of certain computer-driven processes that are transparent to the end user or consumer, but need to be performed in order to complete the requested task or transaction.

For instance, it is not uncommon for there to be two or more independent computer applications that are used along with certain business rules to process a transaction. Typically, a person is trained to work on the independent computer applications in conjunction with the business rules. When the person processes the transaction, the computer peripherals (e.g., keyboard, mouse) are used along with the person's cognitive skills to process the transaction. In an example of ordering a good, such as a desktop computer, a first computer application may be used for entering consumer data, such as selecting the type of desktop computer to be ordered and entering payment information. A person would then review the order placed using the first computer application, and determine whether any changes need to be made in accordance with the applicable business rules. The business rules could, for instance, require that certain shipping costs be added to the price of the order or that the memory of the desktop computer be upgraded. If this is the case, then the person would take the applicable business rules into account when the person is entering the information into a second computer application to complete the order process so that the desktop computer is shipped to the appropriate recipient.

There also may be two or more independent computer applications developed by different or multiple companies for achieving a desired output. In this situation, the independent computer applications may not have data connectivity to enable them to transfer data between the computer applications. As was the case with the previous example, a person is trained to operate the computer application using the computer peripherals and his cognitive skills to complete a transaction.

In another example, during the process of placing an order on the Internet for consumer goods, a consumer typically inputs various pieces of order information (e.g., name, address, payment information, desired delivery method) into various data fields displayed on an order placement website to complete the order request. After the order information is provided in the data fields, the order information needs to be communicated to the manufacturer or distributor so that the order can be fulfilled and delivered to the consumer. It is not uncommon for the order placement website to be incompatible with the software that is used to fulfill the customer's order in that the order placement website is not configured to communicate the order information to the fulfillment software application so that the ordered goods are delivered to the consumer. In such cases, a person is employed to manually review the order information that was entered by the consumer and transmitted using the order placement website, and manually type the order information into a separate fulfillment software application so that the ordered good or service will be delivered to the consumer.

In each of the above-referenced instances, the process of manually reviewing and entering consumer data is inefficient from both a time and cost perspective, and is also may be deemed a non-ideal allocation of human resources for non-cognitive based tasks. The quality of the output data also may be reduced due to human error based on a misapplication of business rules, a mistake in reading information from a first computer application, and/or mistake in entering data into the second computer application. These types of inefficiencies are also present in the area of the electronic records management where multiple incompatible or non-integrated software applications are used to create, manage and store electronic records or data.

In recent times, there has been a trend toward addressing the above-referenced inefficiencies by automating such processes using robotics process automation. Robotics process automation is the use of a software application in the form of computer-executable instructions that is configured for performing at least one automated process, which is also referred to as a robot or workflow. In regard to the first two examples provided above, a workflow could be used to automate the communication of data between two independent computer applications while applying predefined business rules to complete the transaction. The use of the workflow eliminates the need for a person to manually apply a set of business rules, which may allow the transaction to be completed in a more efficient and consistent manner. In regard to the last example provided above, a workflow could be used to automate the process of capturing the order information that was entered and transmitted using the order placement website, and automatically inputting the order information into the fulfillment software application. The use of the workflow in this specific instance eliminates the need for a person to manually transfer the order information, which allows for the processing of order in a more time efficient and cost effective manner. The use of a workflow also allows for the scaling of the respective transaction (e.g., the order fulfillment process) since the workflow can be used in processing multiple transactions at the same time, and within a short period of time, from multiple sources using separate copies of the first application program. The advantages of using workflows may also be realized in the context of other types of data collection and processing fields, such as in medical and insurance record keeping.

Despite the growing popularity of using workflows for the purposes described above, there are currently few systems that efficiently facilitate the development and implementation of workflows for use in a target computer application. For instance, existing systems provide no standardization for capturing requirements for developing a workflow, and an end-to-end process overview is not available. Further, workflows are currently developed in a browser specific manner, thereby requiring the development of multiple workflows for each particular browser that will utilize the workflow. Also, during development of a workflow, there is no standardized mechanism for managing the different versions of a workflow thereby making it difficult to identify the latest version of development. This causes confusion amongst the developers of the workflow, particularly when a problem arises with a current workflow and there is a need to revert back to the most recent version of the workflow to isolate the cause of the problem. Different developers may use different versioning systems which creates inefficiency in the ongoing development process. Also, there are inadequate mechanisms for managing access to a particular workflow development thereby making it difficult to track changes that have been made to the workflow and by which developer. As such, there is a need for a system that will address one or more of the above-referenced drawbacks.

BRIEF SUMMARY OF THE INVENTION

As will be described in more detail below, a system including a robotics process automation platform for developing and managing a workflow is provided, wherein the workflow includes computer-executable instructions configured for performing at least one automated process in a target application.

The system may comprise a server and a virtual computing device in communication over a network. The server may comprise a first memory and a first processor, wherein the first memory includes a development database and an operational database. The first processor is configured for executing computer-executable components stored in the first memory comprising a development interface component and a control interface component. The development interface component is configured to allow for the creation of the workflow and storage of the workflow in the development database. The control interface component is configured for selecting the workflow stored in the development database and storing a copy of the workflow in the operational database. The virtual computing device comprises a second memory and a second processor. The second processor is configured for executing at least one computer-executable component stored in the second memory comprising a runner component that is configured for receiving instructions from the control interface component to store a copy of the workflow stored in the operational database in the second memory. The runner component is also configured for instructing the second processor to execute the workflow that is stored in the second memory in association with the target application.

In another aspect, the development interface component may include a version control component that is configured for assigning a unique version identifier to the workflow when the workflow is edited and stored in the development database as a new version. The version control component may also be configured for identifying changes that were made to the new version of the workflow stored in the development database relative to a previously stored version of the workflow. The version control component may also allow at least a portion of the workflow to be tagged, wherein the tagged portion of the workflow is not able to be edited by the development interface component.

In yet another aspect, the development interface component may include a dynamic link library manager that provides access to at least one dynamic link library stored in the development database, wherein the at least one dynamic link library provides instructions to perform a method or activity configured for use in the workflow. The dynamic link library manager is configured for allowing for the addition of one or more dynamic link libraries to the development database. The dynamic link library manager may be configured for displaying the method or activity associated with the at least one dynamic link library.

In still another aspect, the development interface component may include includes a text parser component that is configured for capturing text included in a digital document provided by the target application. The text parser may be configured for: allowing for the selection of a starting point within the digital document at a predetermined line and a predetermined character position within the predetermined line; allowing for the selection of a number of characters to be copied; and capturing the selected number of characters beginning at the starting point and storing the captured text in the second memory. The text parser may also be configured for: allowing for the selection of a starting point within the digital document at a predetermined line and a predetermined character position within the predetermined line; detecting the presence of one or more characters from the starting point; detecting a predetermined number of blank spaces following the detected one or more characters; upon detecting the predetermined number of blank spaces, detecting the presence of a character following the detected predetermined number of blank spaces; and upon detecting no character following the predetermined number of blank spaces, allowing for the capture of the one or more characters detected from the starting point in the second memory.

In another aspect, the target application may be a first target application that is configured for receiving input information from a remote computing device, wherein the workflow is configured for receiving the input information from the first target application through an input/output (I/O) component, and wherein the workflow is configured for communicating output information to a second target application that is representative of the input information through the I/O component. In this aspect, the development interface component may include a verify value component that is configured for: copying the input information in the second memory; copying the output information in the second memory prior to the workflow communicating the output information to the second target application; comparing the input and output information stored in the second memory; and ceasing the execution of the workflow if the input and output information stored in the second memory do not match.

In yet another aspect, the system may further comprise at least one administrator computing device in communication with the server over the network, wherein the at least one remote administrator computing device is configured to utilize the control interface component. The control interface component may be configured for instructing the runner component to start and stop the workflow from running on the second processor of the virtual computing device.

In still another aspect, the control interface component may include a credential manager component that allows for the association of target credential information with the workflow to provide access to the target application. The target credential information may be encrypted and stored in the operational database. Further, a remote computing device may be in communication with the credential manager component over the network, wherein the remote computing device is configured for inputting the credential information and storing the credential information in the operational database. Moreover, the control interface component may include an environment manager component that provides the workflow with access to one or more of an end point file, a configuration file, or a dynamic link library file.

In another aspect, the system may further include a user management component stored in the first memory that is configured to provide access to at least one of the development interface component and the control interface component upon receipt of access information that matches authorized access information stored in at least one of the development database and the operational database. The authorized access information may correspond to an authorized user, and the user management component is configured for assigning the authorized user to a program associated with the workflow.

In yet another aspect, the runner component is configured for storing log information in the operational database, wherein the log information is related to the state of the workflow and/or the virtual computing device. The system may further comprise a display, wherein the control interface component is configured for displaying the log information on the display.

In still another aspect, the computer-executable components stored in the first memory further include a requirement gathering interface component that is configured for allowing one or more files to be created, captured, and/or stored in a requirements database. The requirements database may be stored in the first memory, wherein the one or more files are associated with the development of the workflow. The one or more files may include data representative of at least one of a video, audio, digital photograph, or diagram. The diagram may be at least one of a context diagram, functional decomposition diagram, use case diagram, sequence diagram, and current and future process model.

In another aspect, a computer-implemented method for development and management of a workflow may be provided. Utilizing at least one processor, the method comprises the steps of: providing a development database and an operational database; creating a workflow and storing the workflow in the development database; selecting the workflow stored in the development database and storing a copy of the workflow in the operational database; communicating a copy of the workflow stored in the operational database to a virtual computing device; and executing the workflow on the virtual computing device in association with the target application.

In yet another aspect, the method may include at least one of allowing for the start and stop of the workflow running on the virtual computing device using a remote computing device over a network, and storing log information related to the workflow executed on the virtual machine in the operational database.

In still another aspect, the method may include at least one of allowing for the association of credential information with the workflow to provide access to the target application, encrypting the credential information, and storing the encrypted credential information in the operational database.

In another aspect, the method may include one or more of allowing for the workflow to be edited, assigning a unique version identifier to the workflow when the workflow is edited and stored in the development database as a new version, identifying changes that were made to the new version of the workflow stored in the development database relative to a previously stored version of the workflow, and tagging at least a portion of the workflow so that the tagged portion is not able to be edited.

In yet another aspect, the method may include providing access to at least one dynamic link library stored in the development database, wherein the at least one dynamic link library provides instructions to perform a method or activity configured for use in the workflow. The method may allow for the addition of one or more dynamic link libraries to the development database.

In still another aspect, the method may comprise the steps of: allowing for the selection of a starting point within a digital document provided by the target application at a predetermined line and a predetermined character position within the predetermined line; allowing for the selection of a number of characters to be copied; and capturing the selected number of characters beginning at the starting point and storing the captured text in a memory.

In another aspect, the method may comprise the steps of: allowing for the selection of a starting point within a digital document provided by the target application at a predetermined line and a predetermined character position within the predetermined line; detecting the presence of one or more characters from the starting point; detecting a predetermined number of blank spaces following the detected one or more characters; upon detecting the predetermined number of blank spaces, detecting the presence of a character following the detected predetermined number of blank spaces; and upon detecting no character following the predetermined number of blank spaces, allowing for the capture of the one or more characters detected from the starting point in a memory.

In yet another aspect, wherein the target application is a first application that is configured for receiving input information from a remote computing device, the method comprises the steps of: receiving the input information from the first target application; and communicating output information to a second target application component that is representative of the input information. Further, the method may also comprise the steps of: copying the input information in the second memory; copying the output information in the second memory prior to the workflow communicating the output information to the second target application; comparing the input and output information stored in the second memory; and cease the execution of the workflow if the input and output information stored in the second memory do not match.

In another aspect, a non-transitory computer readable medium may be provided with instructions stored thereon, that when executed on a processor, perform the steps of: creating a workflow and storing the workflow in a development database, wherein the workflow includes computer-executable instructions configured for performing at least one automated process in a target application; selecting the workflow stored in the development database and storing a copy of the workflow in an operational database; communicating a copy of the workflow stored in the operational database to a virtual computing device; and executing the workflow on the virtual computing device in association with the target application.

In yet another aspect, a robotics process automation platform for developing and managing a workflow in a computing environment may be provided. The computing environment includes at least one processor and at least one memory. The platform may comprise a development database and operational database stored in the at least one memory, a development interface, a control interface component, and a runner component. The development interface component includes computer-executable instructions, that when executed on the at least one processor, are configured for creating a workflow and storing the workflow in the development database. The control interface component includes computer-executable instructions, that when executed on the at least one processor, are configured for selecting the workflow stored in the development database and storing a copy of the workflow in the operational database. The runner component includes computer-executable instructions, that when executed on the at least one processor, are configured for receiving instructions from the control interface component to store a copy of the workflow stored in the operational database in a memory of a virtual computing device. The runner component is also configured for instructing the virtual computing device to execute the workflow in association with the target application.

Additional objects, advantages and novel features of the present invention will be set forth in part in the description which follows, and will in part become apparent to those in the practice of the invention, when considered with the attached figures.

BRIEF DESCRIPTION OF THE DRAWINGS

The accompanying drawings form a part of this specification and are to be read in conjunction therewith, wherein like reference numerals are employed to indicate like parts in the various views, and wherein:

FIG. 6 is an exemplary implementation of a text parser that may be included in the development interface component;

DETAILED DESCRIPTION OF THE INVENTION

Generally, the system, tools and methods described herein for providing a robotics process automation platform for developing a workflow, deploying the workflow on at least one virtual computing device, and managing and monitoring the workflow running on the at least one virtual computing device. The workflow, also referred to as a robot, may include computer-executable instructions or one or more sequences of instructions that are configured for performing automated processes within a target computer application ("target application") using data, documents, or other elements that are stored in the virtual computing device or provided to the virtual computing device by or through the use of another computing device or data source. A workflow operates to automate at least one process within the target application that is typically performed by a person, which may be scaled using a plurality of virtual computers to increase efficiency of processing data, documents, or other elements and reduce the need to utilize human capital to perform such a task. It should be understood that the automation of at least one process within a target application may include automating a process that takes place within a single target application, or may include automating a task within a target application that results in the integration of the different components of the target application, such as, for example, linking the operation of an order processing application with an order fulfillment application. It will be understood that the robotics process automation platform may be implemented in the form of software, hardware, or combinations thereof.

Figure 1:
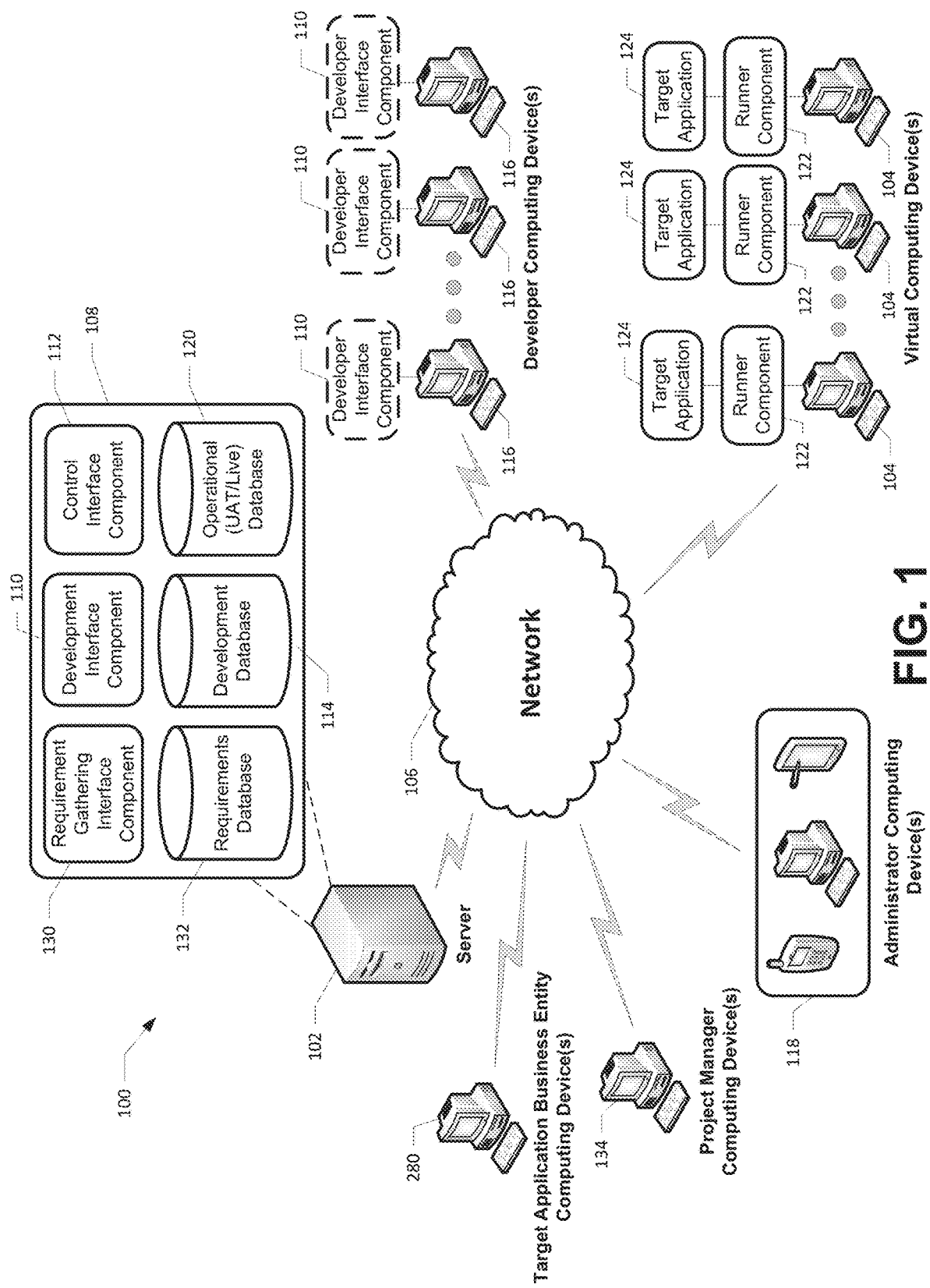
FIG. 1 is a schematic diagram showing an exemplary network environment in which a robotics process automation platform in accordance with an aspect of the present invention may be implemented.

Referring to the drawings in detail, and specifically to FIG. 1, reference numeral 100 generally designates an exemplary network environment or system in which a robotics process automation platform in accordance with one aspect of the invention may be implemented. For instance, system 100 may include a server 102 and at least one virtual computing device 104. Server 102 may either host virtual computing device 104, or be in communication with virtual computing device 104 through a network 106. Network 106 is preferably a secure local area network (LAN), but any other type of networks may also be utilized, including a wide area network (WAN).

Server 102 may include a processor that is configured for executing computer-executable components stored in a memory 108 to implement the system, wherein the computer-executable components may comprise a development interface component 110 and a control interface component 112. Both development interface component 110 and control interface component 112 make up a portion of the robotics process automation platform.

Development interface component 110 includes computer-executable instructions that are configured to allow for the creation and development of a workflow, and storage of the workflow in a development database 114 located within memory 108. It should be understood that development interface component 110 may also be stored locally in a memory of one or more developer computing devices 116 that are in communication with server 102 over network 106. In either instance, developer computing device 116 is used to create and develop the workflow using the functionalities provided by developer interface component 110, which will be discussed in more detail below. It should be understood that development database 114 may be a restricted database that is only accessible by authorized users of development interface component 110 and control interface component 112, wherein development database 114 may not be accessed by virtual computing device 104.

Control interface component 112 includes computer-executable instructions that are configured, in one aspect, to allow for the selection of the workflow stored in development database 114 by one or more administrator computing devices 118 that are in communication with server 102 through network 106. It should be understood that administrator computing devices 118 may be a desktop computer, laptop, tablet, smartphone or the like. After selection of the workflow in the development database 114, control interface component 112 is configured for storing a copy of the workflow in an operational database 120 located within memory 108 in preparation for deployment to a runner component 122, which is a component of the robotics process automation platform. Operational database 120 is a database that may be used to store the workflow for utilization in either a User Acceptance Testing (UAT) implementation or live implementation using virtual computing device 104.

Virtual computing device 104 may include a processor that is configured for executing computer executable instructions and/or at least one computer-executable component, including runner component 122. While system 100 is described herein as including virtual computing device 104, it should be understood that a physical computing device (e.g., desktop computer, laptop, etc.) may also be used to execute runner component 122 and perform all functions that are described herein with respect to virtual computing device 104.

Runner component 122 may be stored in a memory of virtual computing device 104. Runner component 122 includes computer-executable instructions that are configured for receiving instructions from control interface component 112 to store a copy of the workflow, located in operational database 120, in a memory of virtual computing device 104. Runner component 122 is also configured for instructing virtual computing device 104 to execute the workflow in association with a target application 124, provides a windows service that monitors the state of the runner component 122 in the target system (e.g., virtual computing device), and provides memory management and hard disk drive (HDD) triggers, all of which will be discussed in more detail below.

Target application 124 may be stored in the memory of virtual computing device 104 and be executed by virtual computing device 104. Target application 124 may be configured to allow for the input of data, documents or other items that are utilized by the workflow to automate one or more processes. The data, documents or other items that are utilized by the workflow may be stored in the memory of virtual computing device 104, or stored in a remote memory storage device, and communicated to virtual computing device 104 through network 106 for use by the workflow.

Figure 2:
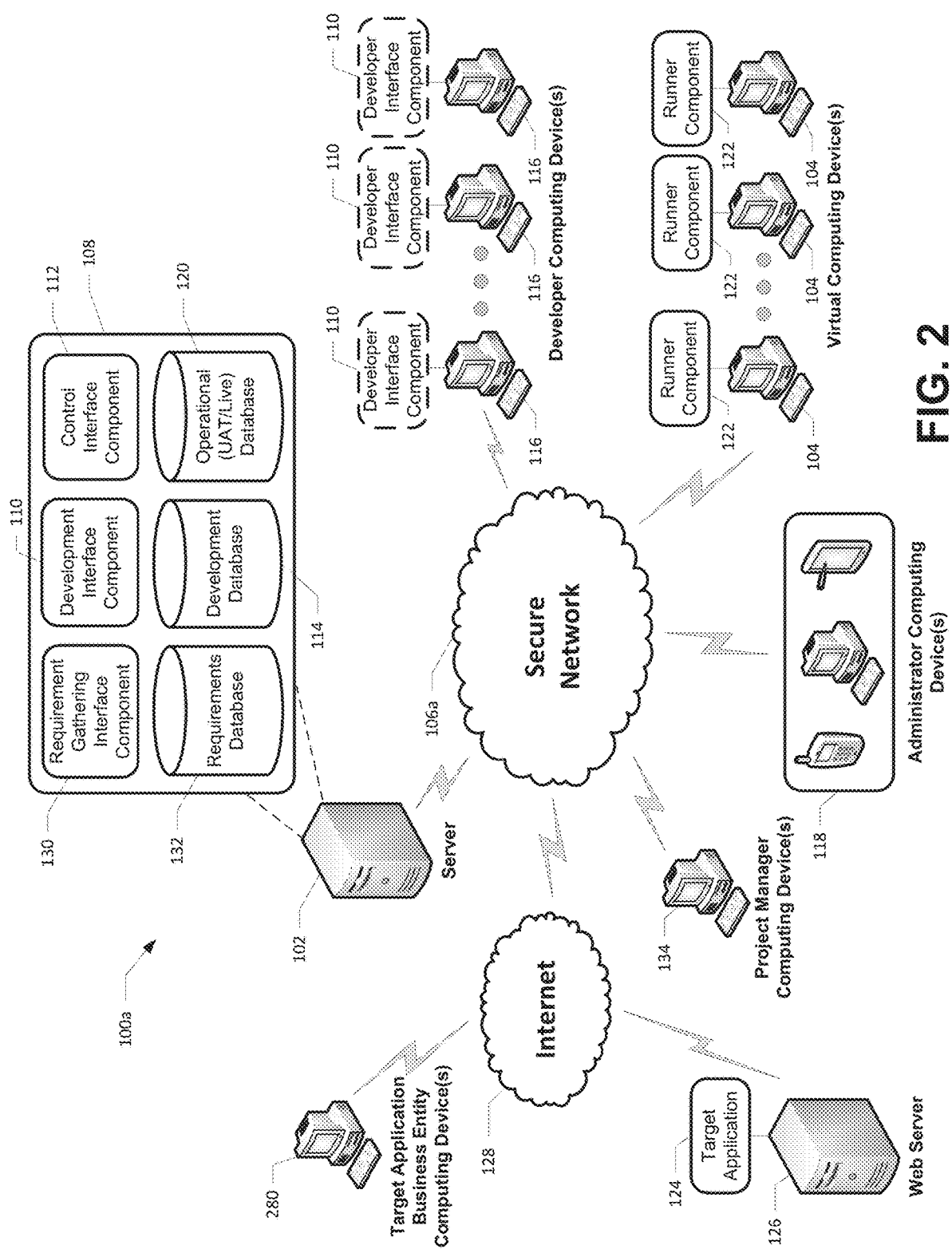
FIG. 2 schematic diagram showing an alternative exemplary network environment in which a robotics process automation platform in accordance with an aspect of the present invention may be implemented.

As best seen in one alternative system 100a shown in FIG. 2, target application 124 may alternatively be stored in a memory of a remote web server 126, and may take the form of a web-based software application. In this instance, target application 124 is accessible over a wide area network 128, such as the Internet, so as to allow users of the Internet to directly interact with target application 124 and provide the input of data, documents or other items. In this configuration, target application 124 is accessible by virtual computing device 104 through networks 106a, 128, whereby the input received by target application 124 may be communicated to virtual computing device 104 for use by the workflow. In the instance that target application 124 is implemented on a website, developer computing device 116 may allow the workflow to be developed in a language that is browser independent, such as by using relative and absolute XPath. This will allow the workflow to be used in conjunction with any web browser (GOOGLE®, FIREFOX®, SAFARI®) without having to redevelop the workflow for each particular browser. Further, it should be understood that a web driver 129 may be used to use the workflow to automate the one or more processes in target application 124.

Figure 3:
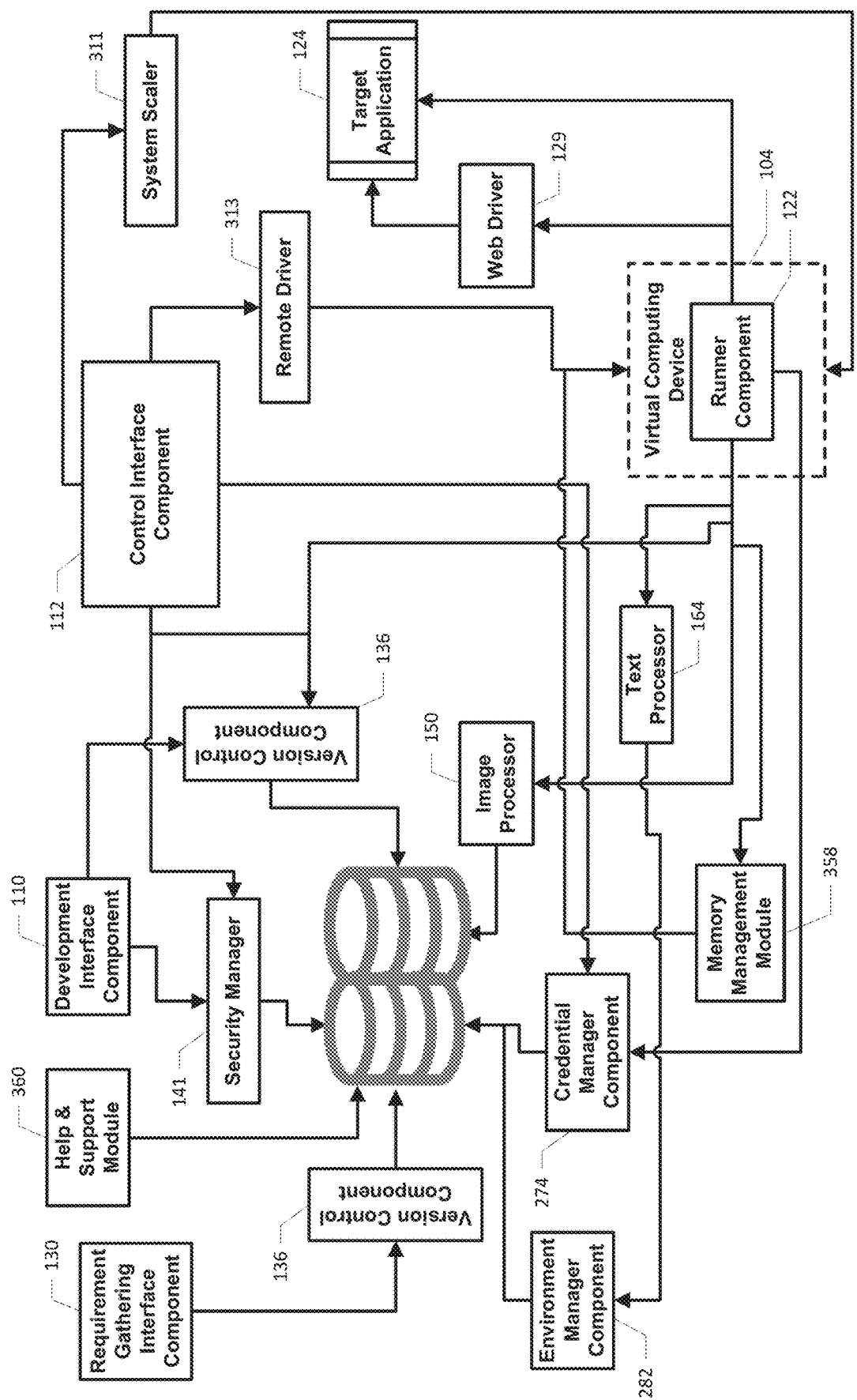
FIG. 3 is a schematic diagram showing components of the robotics process automation platform.

With reference to FIG. 3, robotics process automation platform may include input/output (I/O) component 215 that is configured for communicating data or other information ("data") from one or more target applications 124 to virtual computing device 104 for use or processing by the workflow. After the data is used or processed by the workflow, input/output (I/O) component 215 is configured for communicating the data or processed data from the virtual computing device 104 to one or more target applications, which may be the same or different than the one or more target applications that provided the data to the workflow through I/O component 215.

Having described certain aspects of the robotics process automation platform, other aspects will now be discussed with reference to FIGS. 1 and 3. The robotics process automation may further include a requirement gathering interface component 130 and a requirements database 132 stored in memory 108 of server 102. Requirement gathering interface component 130 includes computer-executable instructions that are configured for capturing requirements of a given project for creating and developing a workflow, which may be provided by a project manager computing device 134, and stored in requirements database 132 for retrieval and/or use by developer computing device 116. Identifying requirements for a project is helpful to define the scope of the project and the desired outcome for a workflow, establish specific, measurable, agreed upon, realistic and time-based goals for development of the workflow, and allow for confirmation that the requirements are agreeable to all parties interested in the workflow.

For example, requirements that may be captured using requirement gathering interface component 130 and stored in requirements database 132 may take the form of one or more files that include data representative of at least one of a video, audio, digital photograph, or diagram. Requirement gathering interface component 130 may include a video capturing module that allows for the capture of any object displayed on a screen as video, audio and digital pictures. For instance, the video capturing module is configured for saving recorded screen videos to .avi format and convert to .swf (flash file), .wmv (windows media video), and .exe (executable file) format, saving captured screen videos to .jpg, .png, and .bmp formats, selecting any portion of the screen for recording (full desktop, a window, a region, picture-in-picture, auto-pan recording), recording audio from a microphone, speakers, CD audio, MIDI, etc., and audio source selection from BSR screen recorder.

Requirement gathering interface component 130 may also provide for the generation of different types of diagrams, such as, but not limited to, context diagrams, functional decomposition diagram, use-case diagram, sequence diagram, and as-is (current) and to-be (future) process model. A system context diagram defines the boundary in which the workflow will operate in the context of a customer's system, its surrounding environment and all the interacting entities. The system is plotted in the middle of the diagram and identifies customers, external or internal systems, the organization's end users and any vendors or suppliers providing third-party services. By building a visual model of the software solution, there will be a better understanding of the major interactions and components of the system. It also helps to define the context where the system sits so the end user can agree to what is in scope and what is out of scope in the project. A functional decomposition diagram provides a top-down view of the business process and/or the system's major functions. This diagram also helps validate all the functions the system should provide. A use case diagram helps depict the interaction between the system and its users. Each user role is called an "actor" and different processes or functions are represented in the diagram. Each of these interactions can be further broken down into steps including the preferred path and alternative paths. A sequence diagram shows the interactions between the elements of the system over time. It provides a top-to-bottom view with messages being sent back and forth between the different elements of the system. The elements can be actors, systems or sub-packages within a system. An as-is process model describes the current business process flow. It is typically worthwhile spending the time documenting the as-is for major processes or complex processes so the development team can develop a common understanding of the customer's business process. After the files are generated using requirement gathering interface component 130 and stored in memory 108 in requirements database 132 for access and review by at least developer computing device 116.

As best seen in FIG. 3, the robotics process automation may further include at least one version control component 136 that includes computer-executable instructions that are configured for assigning a new or unique version identifier (e.g., v1, v2, v3, etc.) to a new version of a file (which may include a workflow) each time the file is created, copied, edited or renamed, and stored in a memory. A new version identifier may also be provided when a file is deleted. Version control component 136 may be stored in memory 108 of server 102. Version control component 136 is advantageous in that it allows for retrieval of a file that was stored at a given time, allows for synchronization of file use between multiple users, allows for an older file to be retrieved if errors or mistakes are introduced to a current version of the file, allows for changes to the files to be tracked along with identifying who made the changes, and allows for comments to be associated with a new version of a file to explain changes that were made relative to a previous version of the file.

For example, the first time a file representative of a requirement is created by or uploaded using requirement gathering interface component 130 and a save operation is initiated by project manager computing device 134, version control component 136 computes a new version identifier (e.g., v1). Version control component 136 then determines if the version of the file that is to be stored in requirements database 132 is identical to a version already stored in requirements database 132. Since this is the first time the file is being stored in requirements database 132, the initial version of the file is stored in the requirements database 132 and labeled with the new version identifier (e.g., v1).

If the file is to be modified by project manager computing device 134, the file is checked out from requirements database 132. Once the revisions are complete, the file is checked in by uploading the file to requirements database 132. Version control component 136 then computes a version identifier based on the attributes and/or content of the file. If version control component 136 determines that the version of the file is different (e.g., v2) compared to a version of the file that was previously stored in requirements database 132, then the new version (e.g., v2) is stored in requirements database 132. If version control component 136 determines that the version of the file is the same (e.g., v1) compared to a version (e.g., v1) of the file that was previously stored in requirements database 132 because no changes were made to the file, then the file that is trying to be stored in requirements database 132 will be discarded.

Comments may be associated with the new version of the file when it is uploaded to describe what changes were made relative to the last version (v1), along with a changelog/history of changes that were made since the file was created. An update and synchronization function may also be performed where one or more files have been checked out from requirements database 132, wherein all of the latest revisions to the checked-out files may be obtained from requirements database 132 at one time. Version control component 136 is also configured for discarding any changes that were made to a file that was checked out and reloading the latest version of the file stored in requirements database 132. Moreover, version control component 136 is configured for tagging at least a portion of the file, wherein the tagged portion is not able to be edited any new version of the file.

As best seen in FIGS. 1-4, and as described above, the robotics process automation platform comprises development interface component 110, which includes computer-executable instructions that are configured to allow for the creation and development of a workflow, and storage of the workflow in development database 114 located within memory 108. With reference to FIG. 5, development interface component 110 may include a plurality of development functions 138 that are used to create and develop a workflow using developer computing devices 116. It should be understood that each of development functions 138 may be implemented using computer-implemented instructions or sequences, wherein development functions 138 may be used alone or in combination with each other to create and edit the workflow. Further, development interface component 110 provides for the viewing of workflows on a display of developer computing device 116 during the creation and development of the workflow.

Development functions 138 may include a workflow management component 140 that may be implemented through an application program interface. Workflow management component 140 forms a portion of a security manager 141, which operates to control access to development database 114 and operational database 120. In particular, workflow management component 140 may provide a user authentication module 142, a workflow assignment module 144, an open/save module 146, and a multi-workflow open module 148. User authentication module 142 is configured for requiring the input of user credentials (e.g., user name, password, etc.) using developer computing device 116 that match authorized credentials that are stored in memory 108, prior to allowing access to development interface component 110. Workflow assignment module 144 is configured for assigning or granting access to a workflow to one or more specified authorized users. While there may be many authorized users that have access to development database 114, not all authorized users necessarily should be provided access to a particular workflow for development purposes. Workflow assignment module 144 allows for administrative control of access to workflows in development database 114 to the appropriate authorized users. Open/save module 146 is configured to allow for the opening of a workflow stored in development database 114, and allows for the saving of a workflow that is developed or edited using development interface component 110 using the version control component 136, which will be discussed in more detail below. Multi-workflow open module 148 is configured for allowing multiple workflows stored in development database 114 to be opened and edited at the same time.

Development functions 138 may also include an image processor 150 that is configured for performing different types of image processing functions in the workflow through interaction with target application 124. Image processor 150 may be implemented using an application program interface, and allows for various image processing capabilities, such as, but not limited to, an image spy module 152, image comparison and accuracy module 154, a wait-for-image module 156, an image vanish module 158, a move-to-image module 160, and a click image module 162. Image spy module 152 is configured for allowing a user to identify an image that is displayed on developer computing device 116 and copy the identified image in memory for use by the workflow in conjunction with other functionalities set forth in developer interface component 110. Image comparison and accuracy module 154 is configured for analyzing a source digital image generated by target application 124 (e.g., an image on a webpage) to identify the location of a template digital image located within the source image. The analysis can be done, for example, by sliding the template digital image pixel-by-pixel on top of the source digital image, until an area on the source digital image is identified, through the use of an algorithm, as a match for the template digital image. Image comparison and accuracy module 154 is useful in a situation where a certain area (e.g., customer name) on a source digital image needs to be identified for purposes of developing a workflow, where the location of the area on the source image is subject to change. Wait-for-image module 156 is a function that can be used to delay a specified function in a workflow until a specified image in target application 124 has fully appeared (e.g., wait for home screen to appear upon initiation of target application 124 before starting workflow). Image vanish module 158 is a function that can be used to delay a specified function in a workflow until a specified image in target application 124 has vanished from a display (e.g., waiting for a pop-up window indicating that target application 124 is saving before moving to the next function in a workflow). Move-to-image module 160 is a function that operates to move a cursor to a specified image that is generated by target application 124. Click image module 162 is a function that operates to emulate the click of a mouse or other peripheral once positioned on a specified image generated using target application 124.

Development functions 138 may also include a text processor 164 that is configured for performing different types of text processing functions in the workflow through interaction with target application 124. Text processor 164 may include a text parser component 166 that is configured for automating a process for capturing text included in a digital document provided by target application 124. In one aspect, text parser component 166 is configured for allowing for the selection of a starting point within the digital document at a predetermined line and a predetermined character position within the predetermined line, allowing for the selection of a number of characters to be copied; and capturing the selected number of characters beginning at the starting point and storing the captured text in a memory. This aspect may be used, for example, when the number of characters to be copied is fixed. It should be understood that the terms text and characters are used interchangeably herein, and include letters, numbers, symbols, other elements that are able to be generated by a computing device, and combinations thereof.

Figure 7:
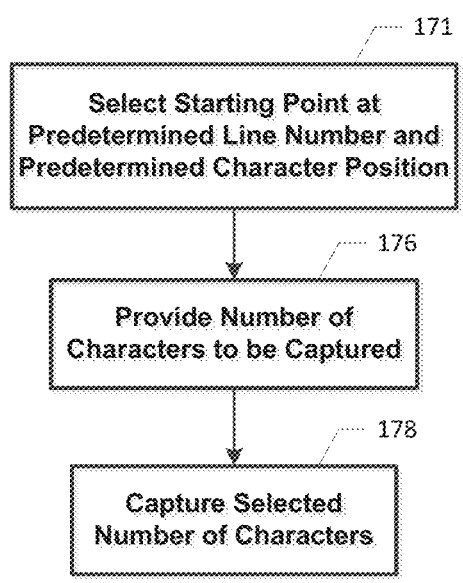
FIG. 7 is a flow chart showing the steps in the exemplary implementation shown in FIG. 6.

For example, in this aspect, text parser module 166 may be used to capture text that does not vary in length on a digital document to provide the workflow with the ability to duplicate text that is displayed on the digital document. For instance, as best seen in FIG. 6, a digital document 168 such as a webpage may be provided by a website application (i.e., target application 124) including text that is representative of payment information provided by a customer when purchasing a product using the website application. Payment information such as a credit card number inputted during the ordering process typically does not vary as credit card numbers include sixteen digits. With additional reference to FIG. 7, through the use of text parser component 166, at step 171, a starting point 170 within digital document 168 may be identified by a predetermined line number 172 and a predetermined character position 174 within predetermined line number 172. In this example, the objective of the workflow may be to capture the credit card number included digital document 168 so that this text can be used to process the payment for the ordered product. Starting point 170 is identified as line number 14 and character position number 1. Next, at step 176, a number of characters to be captured is provided, in this example, the number of characters would be provided as sixteen. Next, at step 178, the selected number of characters (e.g., sixteen) beginning at starting point 170 are captured and the captured text (e.g., "8967465512357809") is stored in a memory of virtual computing device 104, such as a clipboard, for example.

Figure 8:
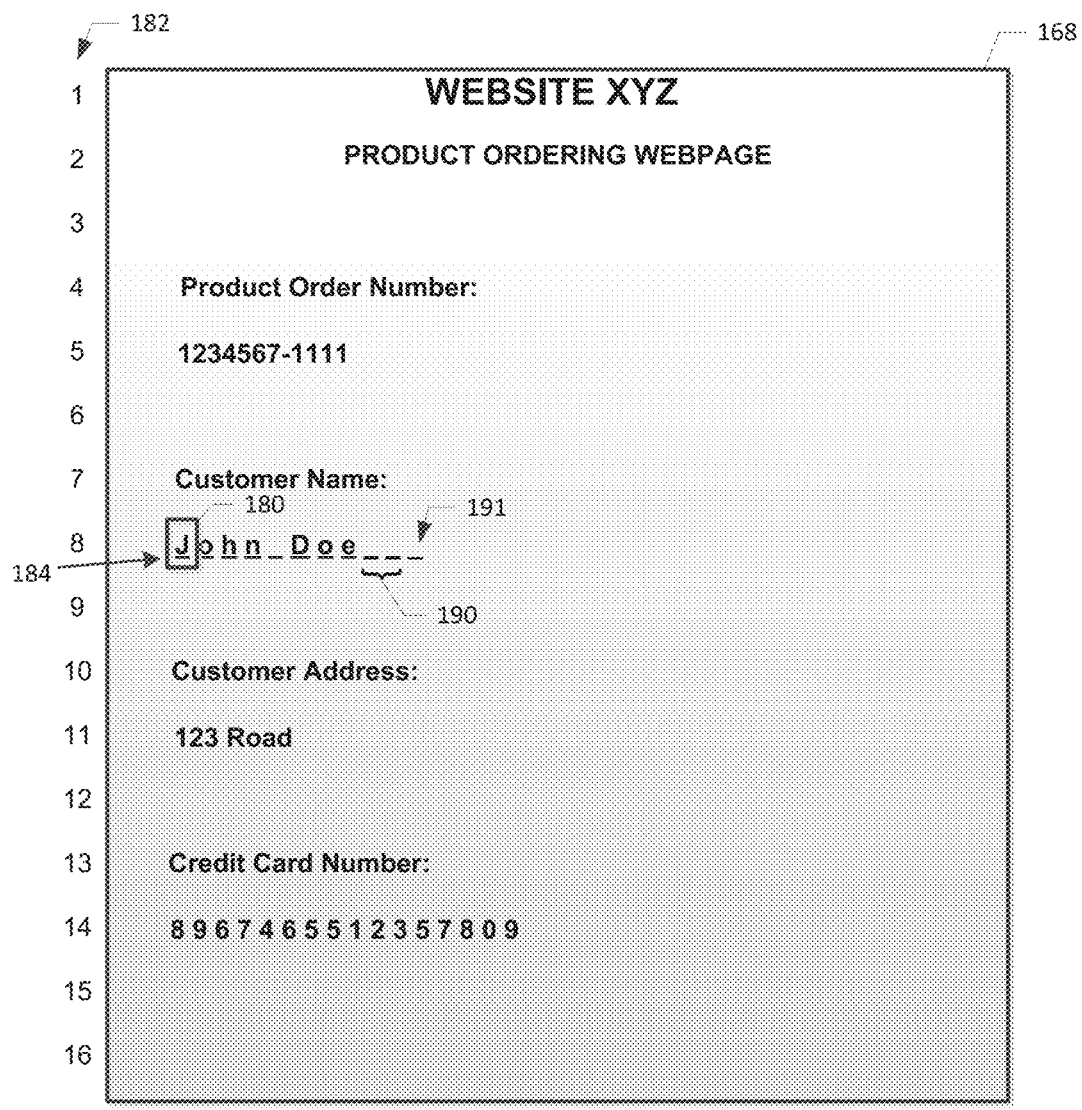
FIG. 8 is another exemplary implementation of the text parser that may be included in the development interface component.
Figure 9:
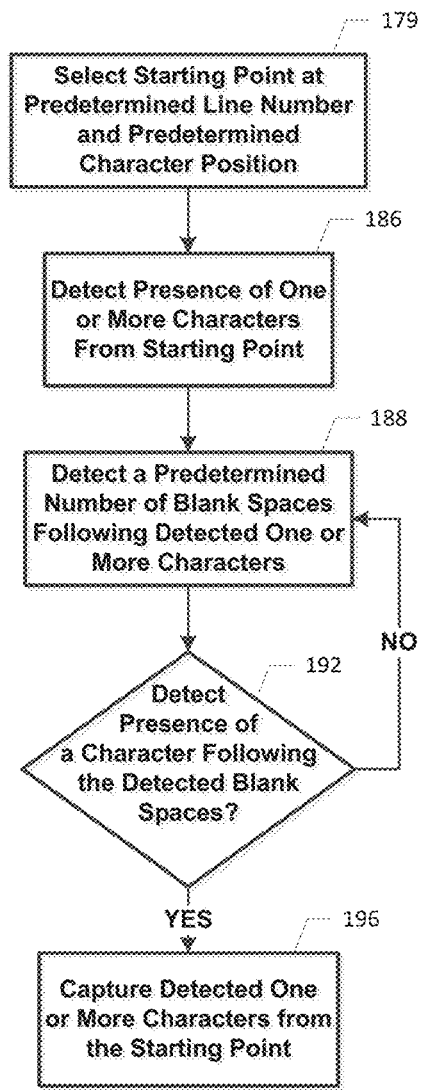
FIG. 9 is a flow chart showing the steps in the exemplary implementation shown in FIG. 8.

In another aspect, text parser component 166 may alternatively or additionally be configured for capturing certain text in digital document 168 where the number of characters in the text to be captured in digital document 168 varies. For example, when a workflow is used to capture the name and address of a customer for a particular order, the text for these items of information typically vary in length from one customer to another. As such, this aspect of text parser component 166 allows for the capture of variable length text. As best seen in FIG. 8, digital document 168 such as a webpage may be provided by a website application (i.e., target application 124) including text that relates to the name of a customer that placed an order for a product through a website. With additional reference to FIG. 9, through the use of text parser component 166, at step 179, a starting point 180 within digital document 168 may be identified or selected by a predetermined line number 182 and a predetermined character position 184 within predetermined line number 182. In this example, starting point 180 is identified as line number 8 and character position 1. Next, at step 186, the presence of one or more characters from starting point 180 is detected. At step 188, a predetermined number of blank spaces 190 is detected following the detected one or more characters. For example, text parser component 166 may be implemented to detect two blank spaces following the detection of certain characters from starting point 180. Upon detecting the predetermined number of blank spaces 190, text parser component 166 then detects whether or not a character is present directly following (as identified with reference numeral 191) the detected predetermined number of blank spaces 190, at step 192. Upon detecting no character following the predetermined number of blank spaces 190 (as seen in FIG. 8), text parser component 166 captures the detected one or more characters 194 (i.e., John Doe) from the starting point at step 196. The captured characters 194 may then be stored in a memory of virtual computing device 104, in a clipboard, for example. If text parser component 166 detects character at 191 following the predetermined number of blank spaces 190, text parser component 166 returns back to step 188 along the predetermined line number.

While text parser component 166 has been described with respect to an order processing system, it should be understood that text parser component 166 can be utilized with any type of target application where text needs to be captured and/or used in a workflow.

As best seen in FIG. 5, development functions 138 of development interface component 110 may also include a web processor 198 that is configured for performing different types of functions in the workflow that require interaction with one or more websites on the Internet through interaction with target application 124. For example, web processor 198 may include a web spy element module 200 and a browser emulator module 202. Web spy element module 200 is configured for allowing a user to identify an image that is generated by a website on a webpage and displayed on developer computing device 116, and copying the identified image in memory for use by the workflow in conjunction with other functionalities set forth in developer interface component 110.

Development functions 138 may further include a keyboard and mouse module 204 that allow for the workflow to automate the use of keyboard and mouse functions. For example, keyboard and mouse module 204 may allow the workflow to automate movement of a mouse point in the x and y axes 206, provide for the automation of single and double clicking of the mouse 208, provide for the automated copying and pasting text, provide a verify value component 212, provide for the automated typing of text 214, and provide for the automated delay between the typing of characters 216.

In one aspect, verify value component 212 is used in the context where one or more workflows are utilized to integrate two separate target applications, such as in the context of an ordering system that uses separate ordering systems and fulfillment systems. In such a scenario, the first target application is configured for receiving input information from a remote computing device (e.g., a customer computing device). Data or information representative of the inputted information ("data") is extracted from the first target application and sent to an input/output (I/O) component 215 for receipt by virtual computing device 104. The data may then be used or processed by virtual computing device 104 in accordance with the computer-executable instructions provided in the workflow. After the data is used or processed by the workflow, it is then communicated to and received by the second target application through I/O component 215. For example, verify value component 212 may be used in a workflow if it is desired to verify that the value (e.g., number of units of a product, amount to be insured under an insurance policy, etc.) entered in the first target application and communicated to workflow through I/O component 215 matches the value to be communicated to the second target application by the workflow. In some instances, the value communicated to the first target application does not match the value communicated to the second target application due to data transmission issues or other types of technical processes that may occur in a workflow.

Figure 10:
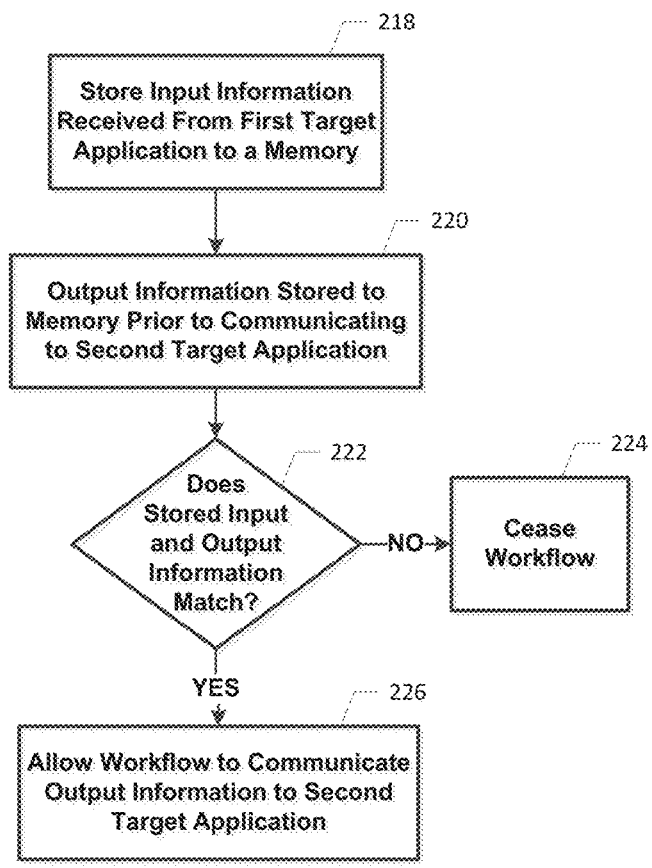
FIG. 10 is a flow chart showing exemplary implementation of a verify value component of the development interface component.

With reference to the scenario mentioned above and FIG. 10, verify value component 212 may be configured for copying the input information obtained from the first target application in the memory of virtual computing device 104 (e.g., in clipboard of virtual computing device 104), at step 218. For example, if the first target application is an order processing application, the input amount could be the number of units to be purchased (e.g., Input=Purchased Units: 400). Next, at step 220, the output information is then copied in the memory of virtual computing device 104 prior to the workflow communicating the output information to the second target application. Verify value component 212 then compares the input and output information stored in the memory of virtual computing device 104 at step 222, and operates to cease the execution of the workflow if the input and output information stored in the memory of virtual computing device 104 do not match at step 224. For example, if the output information is an amount that is inconsistent with the input amount (Output=Purchased Units 40), verify value component 212 will stop the workflow from continuing because the input information (i.e., 400) does not match the output information (i.e., 40). Verify value component 212 therefore ensures that the input information received from the first target application matches the output of such information being sent to the second target application to help avoid malfunctions in the automation process. If the input and output information stored in memory of virtual computing device 104, then workflow is permitted to communicate the output information to the second target application, at step 226. It should be understood that the input and output information may be one or more characters.

As best seen in FIG. 5, development functions 138 may further include an optical character recognition (OCR) component 228 to process digital documents provided to workflow from target application 124. For example, OCR component 228 may include a screen positioning module 230 that operates to readjust modify the position of a digital document that will be utilized by a workflow so that other development functions 138 can operate properly or more efficiently. OCR component 228 may also include a OCR engine 232 that operates to convert the content of a digital document associated with target application 124 into machine-encoded text so that workflow can copy or otherwise use the content in the digital document to automate one or more processes.

Development functions 138 may further include a database connectivity module 234 that is configured for allowing for the development component interface 110 to open and close a communication path with an identified database. Open/close database communication component 236 may be configured to operate in conjunction with security manager 141 and user authentication module 142, to control access to development database 114.

Development functions 138 may further include a dynamic link library (DLL) manager 238 that provides access to at least one dynamic link library stored in development database 114, wherein the at least one dynamic link library is configured for use in the workflow. A dynamic link library is a library that includes computer-executable instructions that can be used by more than one program or workflow at the same time, which provides for automation of certain processes, methods or activities. Development interface component 110 allows for multiple dynamic link libraries to be stored in the development database 114 to facilitate the creation and development of workflows within the robotic process automation platform. DLL manager 238 is also configured for allowing additional dynamic link libraries to be stored in development database 114 and made available for use in creating and developing workflows using the robotic process automation platform. Further, DLL manager 238 is configured to allow for the processes, methods or activities represented by each dynamic link library to be displayed 242 on developer computing device 116 to provide a visual representation of the respective process, method or activity to assist with creating and developing a workflow.

Figure 4:
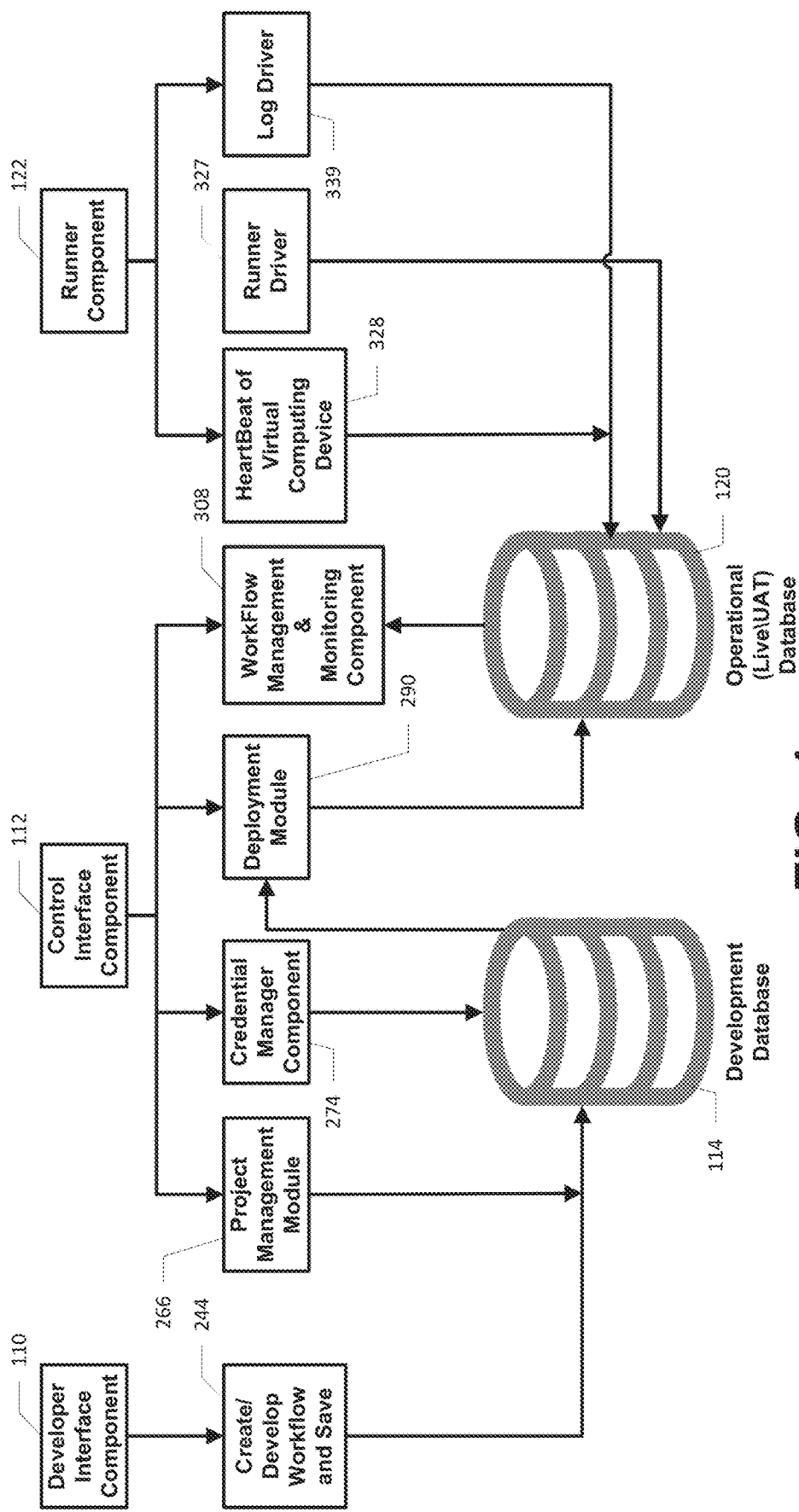
FIG. 4 is a flow chart showing the general functional interaction between certain components of the robotics process automation platform.
Figure 5:
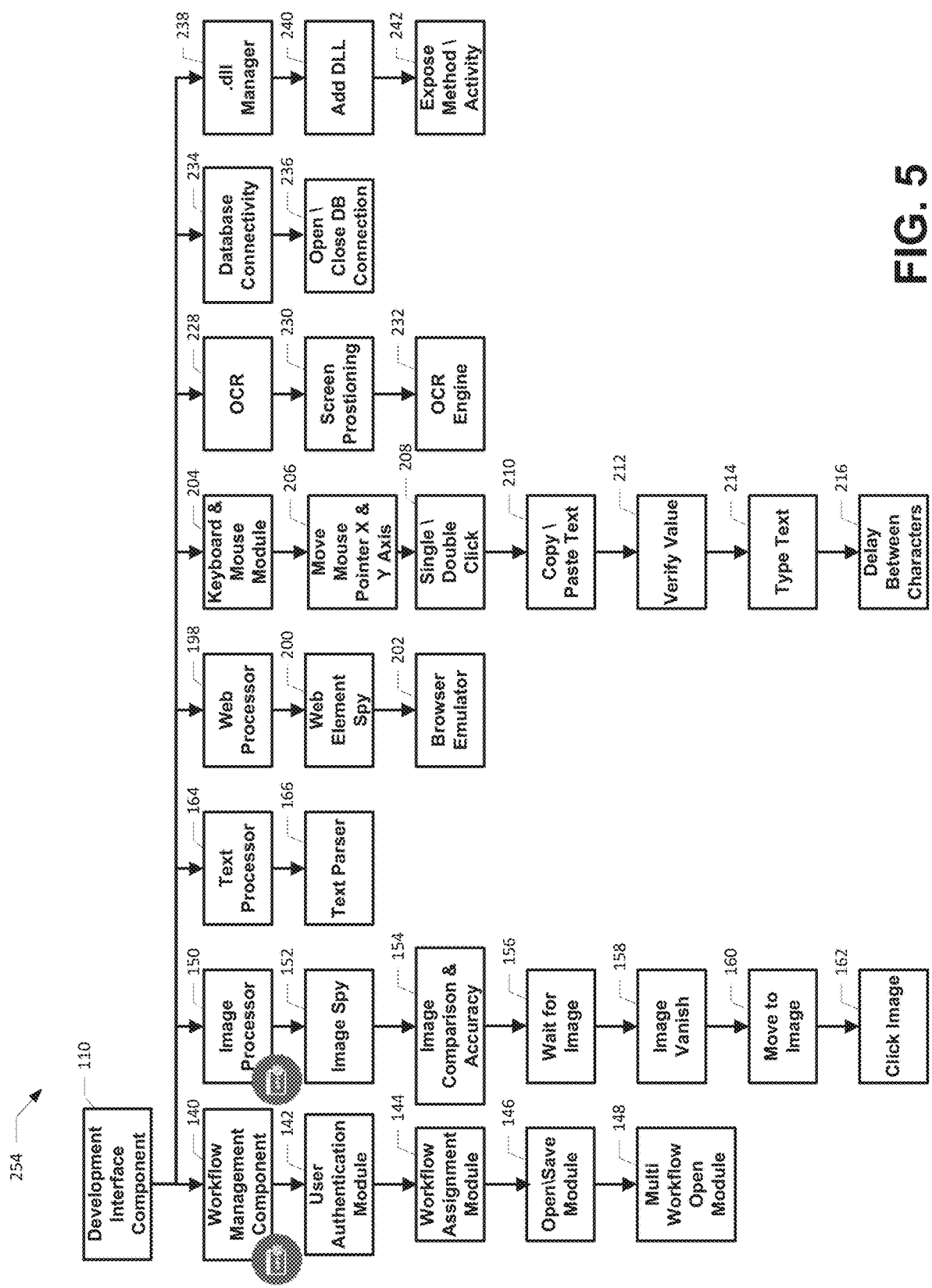
FIG. 5 is a schematic drawing showing certain aspects of a development interface component of the robotics process automation platform.

As previously described, development interface component 110 may use one or more development functions 138 to create and develop a workflow, and store the workflow in development database 114, as seen in FIG. 4 with reference to numeral 244. As best seen in FIG. 3, development interface component 110 may utilize version control component 136 to store and manage each version of a workflow that is stored in development database 114. Version control component 136 may be configured for assigning a new version identifier (e.g., v1, v2, v3, etc.) to a new version of a file (which represents a workflow) each time the file is created, edited and stored in development database 114. For example, the first time a file representative of a workflow is generated by development interface component 110 and a save operation is initiated by develop computing device 116, at step 246, version control component 136 computes a new version identifier (e.g., v1) at step 248. Version control component 136 then determines if the version of the workflow that is to be stored in development database 114 is identical to a version already stored in development database 114, at step 250. Since this is the first time the workflow is being stored in development database 114, the initial version of the workflow is stored in the development database 114 and labeled with the new version identifier (e.g., v1).

If the workflow is to be modified by developer computing device 116 at step 246, the workflow is checked out from development database 114. Once the revisions are complete, the workflow is checked in by uploading the workflow to development database 114. Version control component 136 then computes a version identifier at step 248 based on the attributes and/or content of the workflow. If version control component 136 determines that the version of the workflow is different (e.g., v2) compared to a version of the workflow that was previously stored in development database 114, at step 250, then the new version (e.g., v2) is stored in development database 114. If version control component 136 determines that the version of the workflow is the same (e.g., v1) compared to a version (e.g., v1) of the workflow that was previously stored in development database 114 because no changes were made to the workflow, then the workflow that is trying to be stored in development database 114 will be discarded at step 252.

Version control component 136 may be provided with a file locking feature that is configured for communicating a warning to all relevant computing devices when multiple users attempt to edit the same file or workflow. A file or workflow can be marked or identified as requiring a lock before being edited, in which case a sub-version will present the file or workflow in read-only mode until a lock is acquired. Version control component 136 may also allow for comments to be associated with the new version of the workflow when it is uploaded to describe what changes were made relative to the last version, along with a change log/history of changes that were made since the workflow was created. An update and synchronization function may also be performed where one or more workflows have been checked out from development database 114, wherein all of the latest revisions to the checked-out workflows may be obtained from development database 114 at one time. Version control component 136 is also configured for discarding any changes that were made to a workflow that was checked out and reloading the latest version of the workflow stored in development database 114. Moreover, version control component 136 is configured for tagging at least a portion of the workflow, wherein the tagged portion is not able to be edited any new version of the workflow.

As best seen in FIGS. 1-4, robotics process automation platform further comprises control interface component 112, which includes computer-executable instructions that are configured to deploy, monitor and manage one or more workflows that are developed using development interface component 110. Control interface component 108 may be stored in memory 108 of server 112. One or more administrator computing devices 118 may be in communication with control interface component 112 through network 106, and be used to operate control interface component 112. Further, control interface component 112 may provide for the viewing of workflows on a display of administrator computing devices 118 during the deployment, management and/or monitoring of the workflow, as will be described below. Administrator computing devices 118 may be a desktop computer, laptop, tablet, smartphone or the like.

Access to control interface component 112 may be provided by a user authentication module stored in memory 108 of server 102 that is configured for providing an authorized user with access to control interface component 108. For instance, an authorized user may be required to provide a valid user name and password in order to gain access to control interface component 108. The user authentication module may be provided as a portion of security manager 141 shown in FIG. 3. It should be understood that a user that is authorized to access to development interface component 110 may also be authorized to access to control interface component 112, depending upon the role in which this particular user has in a given project. There may be instances in which a user that has access to development interface component 110 but not control interface component 112, and instances in which user that has access to control interface component 112 but not development interface component 110.

Figure 12:
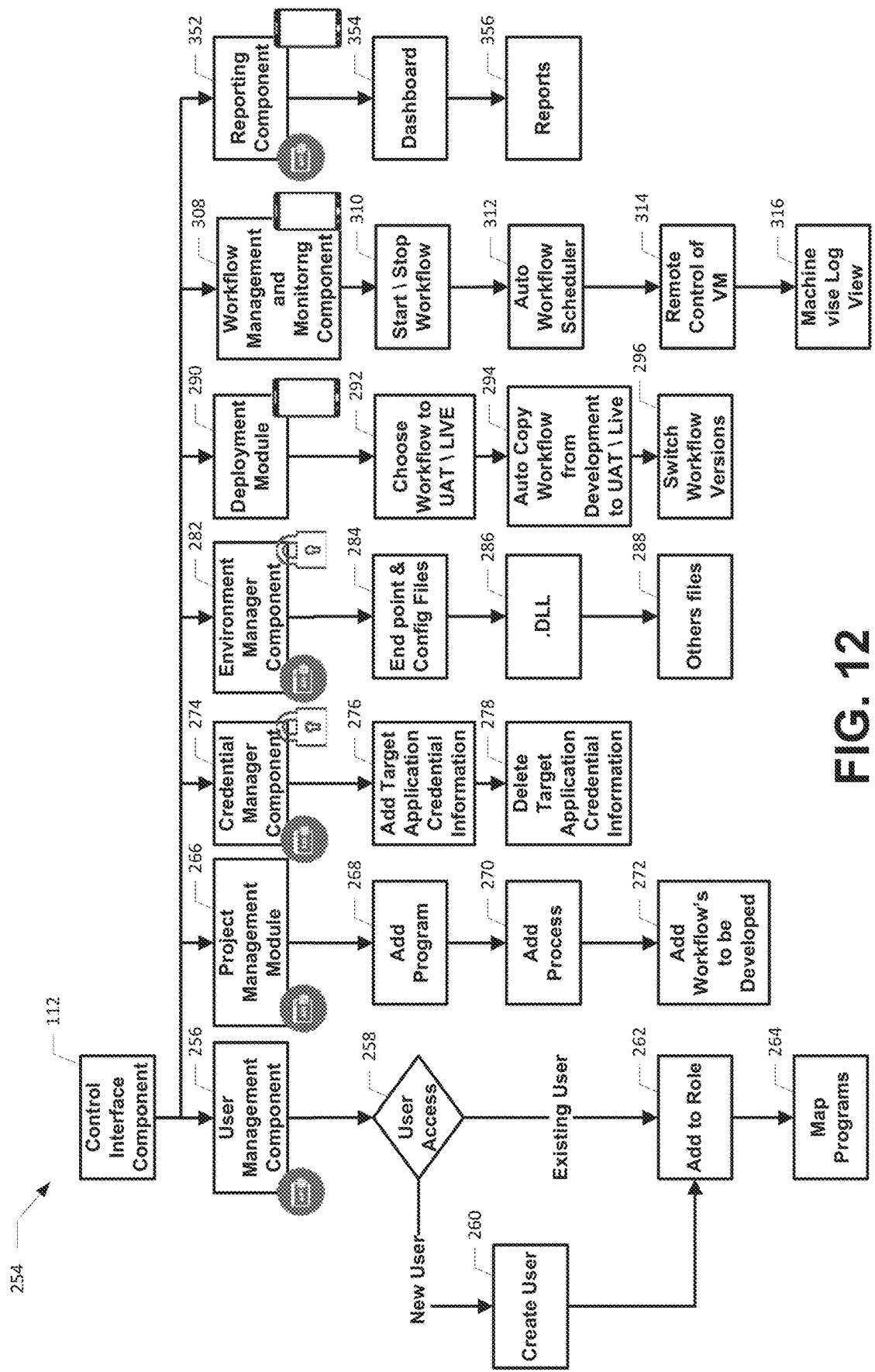
FIG. 12 is a schematic drawing showing certain aspects of a control interface component of the robotics process automation platform.

As best seen in FIG. 12, control interface component 112 may also include a plurality of functions 254 that may be used in implementing at least a portion of the robotics process automation platform, which may be stored in memory 108. For example, one function 254 included in control interface component 112 may be a user management component 256 that is implemented in the form of an application programming interface. User management component 256 is configured for specifying one or more users that should be provided access to development interface component 110 and/or control interface component 108, at 258, and provide for the storage of an authorized user name and associated password in a memory. For example, the authorized user name and password may be stored in either or both of databases 114, 120, or a dedicated database associated with security manager 141. User management component 256 may be used to create a new authorized user at 260. For both new authorized users and existing authorized users, user management component 256 is used to designate access privileges to control interface component 112 and/or development interface component 110, at 262. Since it is possible that an authorized user may be both a developer and an administrator of a particular workflow, it should be understood that administrator computing device 118 may also serve as developer computing device 116, and developer computing device 116 may serve as an administrator computing device 118. However, user management component 256 is configured to restrict a particular authorized user to just the control interface module 112, or just developer interface control 110. Further, user management component 256 also allows for an authorized user to be assigned or mapped to a particular program that one or more workflows will be associated with, at 264.

As best seen in FIGS. 4 and 12, control development module 112 may further include a project management module 266 that is configured for providing a data structure for organizing projects being developed using the robotic process automation platform, which may be implemented in the form of an application programming interface. For instance, project management module 266 may allow for the establishment 268 of a program, which could be an identification of a client that one or more workflows will be developed for. Project management module 266 may also allow for the establishment 270 of one or more process that is designated within an established program, which could be a more specific identification of a system or application environment that the one or more workflows are being developed to work in conjunction with (e.g., order processing system, fulfillment system, etc.). Further, project management module 266 may allow for one or more workflows to be associated 272 with an established process (e.g., automating shipping process, automating generation of order receipt, etc.). This organizational data structure classifies each workflow so that it can be easily located and accessed using developer computing device 116 and administrator computing device 118. In addition to providing a mechanism for organizing one or more workflows that are developed in one or more projects, project management module 266 may also work in conjunction with user management module 256 to provide access to workflows to only those authorized users that have been mapped to a particular program associated with such workflows at 264.

In certain instances, it may be desirable for aspects of target application 124 to be made available to only certain authorized users. One example of such a target application is a web-based order fulfillment software application, where it is desired to prevent the general public from gaining access to the system that control distribution of products to customers. To address this situation, with reference to FIGS. 3, 4 and 12, control development module 112 may further include a credential manager component 274 that allows for target credential information to be associated with a workflow to provide the workflow with access to target application 124 that includes this layer of security. More particularly, in order for the workflow to gain access to such a target application and automate one or more processes within the target application, credential manager component 274 allows for target credential information (e.g., user name, password, etc.) to be stored 276 in development database 114 and/or operational database 120 and be mapped to one or more workflows stored in development database 114 and/or operational database 120. When the workflow is deployed and executed on virtual computing device 104, workflow is able to communicate or use the stored target credential information to target application 124 to gain access to a secure portion of target application 124 so that the one or more processes may be automated. Further, target credential information that is communicated to target application 124 may be encrypted to prevent the target credential information from being discovered by an unauthorized user. It should also be understood that the target credential information stored in development database 114 and/or operational database 120 may also be deleted 278 using credential manager component 274.

Credential manager component 274 may also be configured to allow a remote computing device 280 (FIGS. 1 and 2) that is controlled by a business entity that owns and has control of target application 124 to control the target credential information. In this aspect, credential manager component 274 is configured to allow remote computing device to input, communicate and/or store target credential information associated with one or more workflows to development database 114 and/or operational database 120, and delete credential information from development database 114 and/or operational database 120, through network 106 or networks 106a, 128. In this instance, target credential information may be hidden or masked so that developer computing device 116 and administrator computing device 118 are not able to access and/or view target credential information. In this manner, developer computing device 116 and/or administrator computing device 118 are able to utilize the target credential information so that the workflow can access target application 124 and automate a process in target application 124, but are not exposed to the target credential information which keeps the owner of target application 124 in control of the access to target application 124. It should be understood that the communication of target credential information by remote computing device 280 through network 106 or networks 106a, 128 may be encrypted.

As best seen in FIG. 12, control development module 112 may further include an environment manager component 282 that is configured for providing a workflow with centralized access to different types of files that the workflow depends upon for operation so that the workflow can operate to automate one or more processes in target application 124, without the need for installing these dependency files in different environments. For example, environment manager component 282 operates to provide the workflow with access to one or more end point and configuration files 284, dynamic link library files 286 located in DLL manager 238 (FIG. 5), or any other files that are used for the operation of the workflow. This includes, but is not limited to, any files that are required by the workflow to integrate or interact with target application 124.

Environment manager component 282 may also be configured to convert the format of the workflow between a format in which the workflow is stored in development database 114 (i.e., development format), a format in which the workflow is stored in operational database 120 in order to perform User Acceptance Testing (UAT)(i.e., UAT format), and a format in which the workflow is stored in operational database 120 in order to perform a live implementation (i.e., live format). Therefore, environment manager component 282 can automatically change between each of the development, UAT and live formats during operation of the robotic process automation platform.

As best seen in FIGS. 4 and 12, control interface component 112 may further include a deployment module 290 that is configured to allow administrator computing device 118 to select one or more workflows stored in development database 114 for deployment to a UAT environment or a live environment using virtual computing device 104 at 292, and store 294 a copy of the workflow in operational database 120 at 294. Deployment module 290 provides the workflow with access to all required end point files, configuration files, DLL files, and other files provided in environment manager component 282 so that the workflow will always work as designed regardless of whether the workflow is executed locally or in another machine in a UAT or live environment. Deployment module 290 eliminates the need to install the end point files, configuration files, DLL files, and other files into different environments.

As best seen in FIG. 3, deployment module 290 is in communication with version control component 136 so that a specific version of the workflow can be selected for deployment at 292, or so that administrator computing device 118 can switch between different versions of the workflow at 296, if for instance it is desired to revert back to a previous version of a workflow if a current workflow malfunctions.

Figure 11:
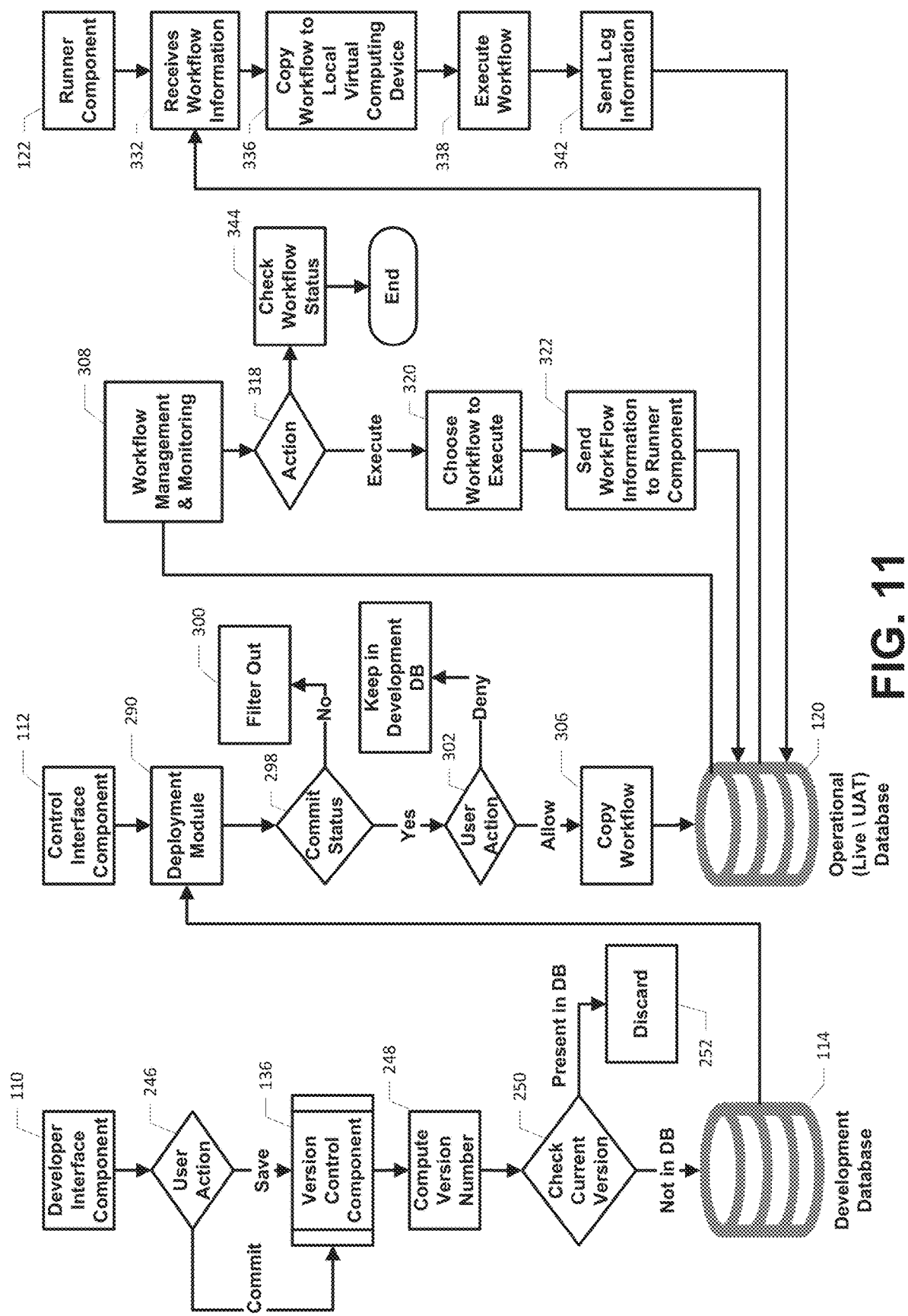
FIG. 11 is a flow chart showing an exemplary implementation of the development interface component, control interface component, and a runner component of the robotics process automation platform.

An exemplary flow showing a deployment of a workflow is provided in FIG. 11. At step 298, the deployment flow includes a determination of whether a particular version of a selected workflow stored in development database 114 was committed or designated for deployment using developer interface component 110. It should be understood that when a workflow is committed for deployment at step 246, such a commit may be done on a version basis, so that a decision to commit a particular workflow for deployment does not need to apply to all versions or more than one version of a particular workflow. At step 246, when a save function is initiated, there is an option provided as to whether the workflow that is being saved should be committed for deployment. If a particular workflow was not committed at step 246, the workflow will be filtered out at step 300. If the workflow was committed at step 246, then there is a further determination as to whether deployment of the workflow will be allowed at step 302. If deployment of a particular committed workflow is not desired, then the workflow may be un-committed for deployment and remain in development database 114 at step 304. If the workflow was committed for deployment at step 246, and deployment is still desired, then the workflow will be copied from development database 114 to operational database 120 at step 306. At this point, the workflow is prepared for either the UAT environment or the live environment.

As best seen in FIGS. 3, 4 and 12, control interface component 112 includes a workflow management and monitoring component 308 (hereinafter referred to as "workflow management component") that is configured for operating in conjunction with runner component 122 to execute the workflow to automate one or more process associated with target application 124. In particular, workflow management component 308 allows for the selection of a workflow that is stored in operational database 120, and operates to provide instructions to runner component 122 to start and stop the execution of selected workflow on a processor of virtual computing device 104 at step 310. As best seen in FIG. 3, control interface component 112 may include a system scaler 311 that allows workflow management component 308 to selectively control (i.e., increase or decrease) the number of virtual computing devices 104 that are being used at any given time to execute the selected workflow with respect to target application 124. Thus, workflow management component 308 has the capability to increase or decrease the number of virtual computing devices 104 that are in service to account for fluctuations in the demand placed on target application 124 to prevent overload on the one or more automated processes being performed by the selected workflow.

Further, with reference to FIG. 12, workflow management component 308 may include an auto workflow scheduler 312 that allows administrator computing device 118 to pre-preprogram start and stop times for execution of the workflow based on a predetermined schedule so that the workflow automatically communicates instructions to runner component 122 to take the instructed action. It is also contemplated that workflow management component 308 allow administrator computing device 118 to take control of virtual computing device 104 remotely through network 106 using a remote driver 313, at 314. Workflow management component 308 may also be configured to receive log information from runner component 122 and display such log information on administrator computing device 118 at 316. Log information may include, but is not limited to, information related to the state of the workflow. For instance, the state of the workflow can be monitored by tracking every instruction, step or sequence of steps that the workflow is programmed to perform. The log information may also take the form of data or text indicating whether a particular step in a workflow was successfully performed or not, thereby facilitating the identification of a problem in the workflow and correction thereof. The log information may also take the form of the time and/or date in which the workflow started and/or stopped running on virtual computing device 104, or the time and/or date that a specific activity or sequence within the workflow started and ended. The log information may also be related to the operational state of virtual computing device 104, such as whether virtual computing device 104 is active or inactive, and the efficiency at which virtual computing device 104 is operating. Further, log information may relate to the health of runner component 122 in virtual computing device 104.

Having described some of the functionalities of workflow management component 308, an exemplary flow will now be described with reference to FIG. 11 showing how workflow management component 308 communicates and interacts with runner component 122. It should be understood that workflow management component 308 may be utilized and controlled remotely using administrator computing device 118 through network 106, and includes all of the previously described functionalities in addition to the functions described below. With reference to step 318, workflow management component 308, through the use of administrator computing device 118, may be used to select a workflow stored in operational database 120 that is to be provided to runner component 122 and executed by virtual computing device 104 at 320. Information related to the workflow (i.e., workflow information), which may include information identifying the file name and location of the workflow stored in operational database 120 and/or the computer-executable instructions that define the workflow, is then communicated to runner component 122 at 322.

Figure 13:
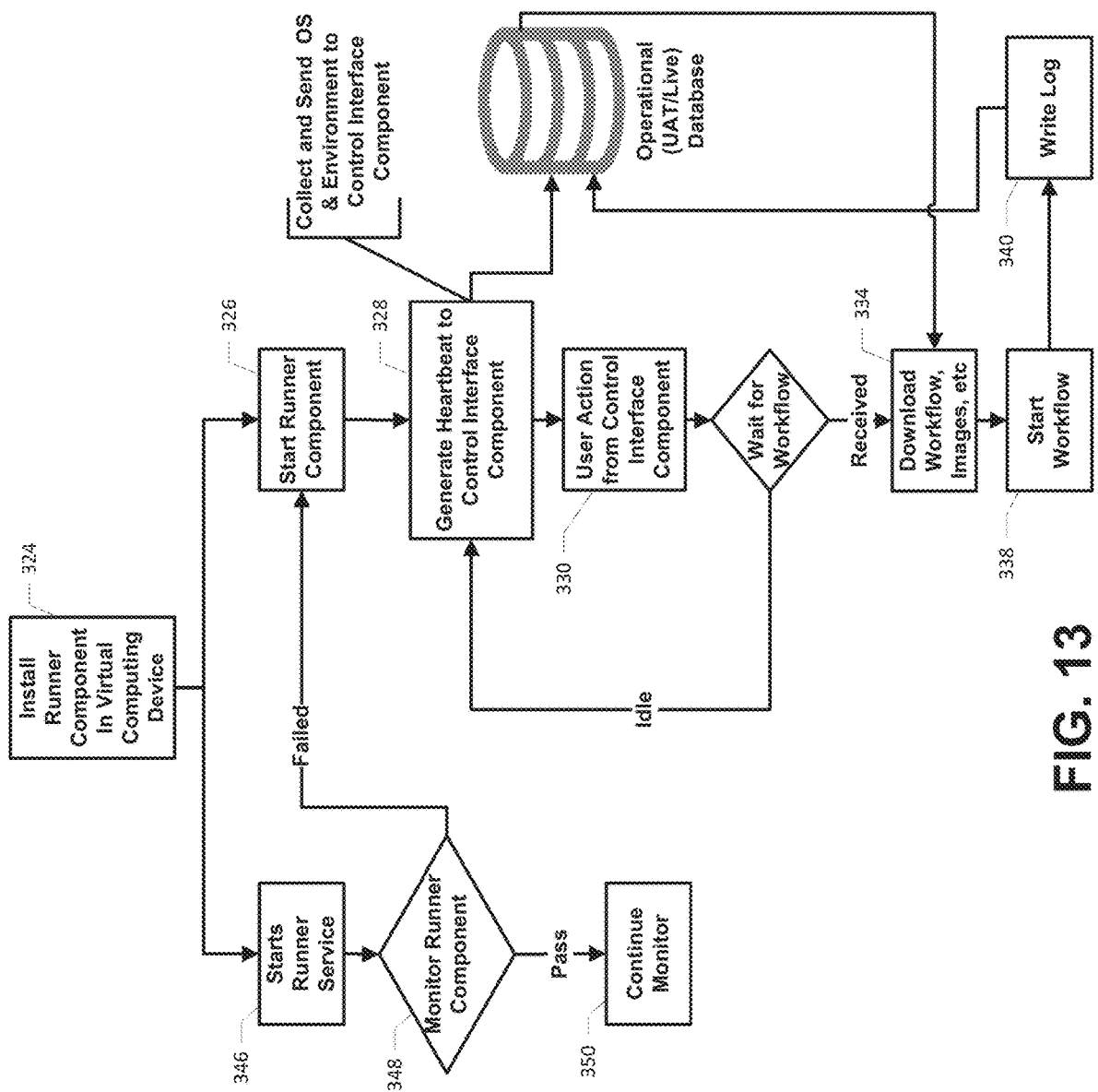
FIG. 13 is a flow chart showing an exemplary implementation of a runner component of the robotics process automation platform.

With reference to FIG. 13, prior to the workflow information being communicated to runner component 122, runner component 122 is installed and stored in a memory of virtual computing device 104 at step 324. A processor of virtual computing device 104 then executes runner component 122 at step 326 so that runner component 122 is operational and placed in communication with workflow management component 308 and/or operational database 120 over network 106 using a runner driver 327 (FIG. 4), at step 328. In conjunction with establishing communication with workflow management component 308 at step 328, runner component 122 may be configured to collect and send operating system and environment information related to virtual computing device 104 to workflow management component 308 at step 329. Runner component 122 then waits for user action from workflow management component 308 at step 330. If runner component 122 does not receive any workflow information from workflow management component 308, runner component 122 is idle. Once workflow information is received by runner component 122 from workflow management component 308 at step 332, runner component 122 downloads the workflow from operational database 120 at step 334 and copied to a memory of virtual computing device 104 at step 336. The workflow is then executed and started by virtual computing device 104 to automate one or more processes in one or more target applications 124, at step 338.

Runner component 122 may also include a log driver 339 (FIG. 4) that is configured for generating log information related to the execution of the workflow on virtual computing device 104, at step 340, which may be stored in the memory of virtual computing device 104. Further, runner component 122 may be configured the communicating the log information to operational database 120 over network 106 for storage in operational database 120, at step 342.

With continued reference to FIG. 13, at step 318, workflow management component 308 may also be configured for monitoring the status of the workflow as it is being executed on virtual computing device 104 through the use of runner component 122, at step 344. After runner component 122 is installed on virtual machine at step 324, runner component 122 may include a runner service (i.e., windows service) starts at step 346 and operates to monitor the execution of one or more instructions, steps or sequences of steps in the workflow at step 348. At step 350, runner service also operates to check whether runner component 122 is running on virtual computing device 104 or not. If runner component 122 is running, then the runner service continues to monitor the execution of the workflow at step 348. If runner service determines that runner component 122 failed (e.g., hung-up, not running, etc.) on virtual computing device 104, the runner service will continue to run in the background and make a determination as to whether virtual computing device 104 should be restarted at step 352. In an instance where a restart of virtual computing device 104 is not required, runner component 122 will be restarted at step 326. In an instance where runner component 122 abruptly exits from virtual computing device 104, for example, the runner service will communicate a notification to workflow management component 308 and reinitiate runner component 122 back into memory of virtual computing device 104 by restarting virtual computing device 104 at step 354, and starting runner component 122 at step 326.

As best seen in FIG. 12, control interface component 112 may include a reporting component 352 that operates to display on a display of administrator computing device 118 the log information stored in operational database 120, or other information related to the current or past state, status or operation of the workflow that is communicated to workflow management component 308 through runner component 122. The display of such information may be, for example, on a dashboard layout 354 and/or in report format 356. Reporting component 352 may be implemented in the form of an application programming interface.

With reference to FIG. 3, runner component 122 may further include a memory management module 358 configured for managing memory utilization in virtual computing device 104, for example, the hard disk drive (HDD) space and random access memory (RAM). In general, computer application memory management involves supplying the memory needed for an application program's objects and data structures from the limited resources available within a computing device, and recycling that memory for reuse when it is no longer required. Because application programs cannot typically predict in advance how much memory they are going to require, they need additional code to handle their changing memory requirements. For example, a workflow or target application 124 that's running in virtual computing device 104 could consume all of the processor's power, which could be a resource-hungry Internet browser with multiple open tabs or a workflow that has crashed. A high usage of background applications may lead to significant slowdowns in an active workflow. In regard to RAM, not freeing data that is no longer in use causes memory leaks. When allocated memory is not freed even though it is never going to be used again, it is known as memory leak. Memory leaks cause an application to use ever-increasing amounts of memory, which in turn may result in poor system performance or workflow or runner application being terminated. Memory management module 358 may be used to avoid crashes of a workflow that is being executed on virtual computing device 104 due to a memory overload.

When an application program running on virtual computing device 104 requests a block of memory in virtual computing device 104, memory management module 358 operates to allocate that block out of the larger blocks it has received from the operating system of virtual computing device 104. When memory blocks have been allocated, but the data they contain is no longer required by the application program, then the blocks can be recycled for reuse. One approach to recycling memory is to allow for a manual determination of when the memory can be reused (i.e., manual memory management). Another approach is to allow memory management module 358 to determine when the memory can be reused (i.e., automatic memory management).

For instance, memory management module 358 may include a live optimization module that is configured for detecting application programs that are not being actively used and are using above a predetermined amount of the processing power of virtual computing device 104, and frees up the processor of virtual computing device 104. The live optimization module operates to free up the processor of virtual computing device 104 by automatically balancing resources more effectively so that the workflow and/or target application 124 may run efficiently on virtual computing device. For example, as best seen in FIG. 13, runner component 122 may start memory management module 358 at step 356 to collect any active computer applications that are stored in the memory (e.g., RAM) of virtual computing device 104 at step 358. If there are no active applications on virtual computing device 104, then the memory management module 358 proceeds to step 326. If active applications are found on the memory, memory management module 358 then determines how much RAM is being used by the active applications relative to a predetermined RAM threshold at step 360. If the active applications are utilizing less than, for example, 75 percent of the RAM threshold, then the process proceeds to step 346 and the workflow can be normally executed. If the active applications are utilizing greater than or equal to the RAM threshold, a forced restart of virtual computing device 104 is performed at steps 352 and 354 and then runner component 122 is started to execute the workflow at step 326. While the threshold mentioned above was 75 percent, it should be understood that this was merely an example and other thresholds may also be utilized. In addition to the functionality mentioned above, the live optimization module may also operate to identify processes that repeatedly need to be optimized.

In the creation and development of workflows, it is common for a team of individuals to work together on an ongoing basis to provide a comprehensive and robust solution to automate one or more processes within a target application. The process of developing workflows in a team environment oftentimes requires the use of common building blocks that comprise various methods, templates, and techniques. Allowing the team members to use a consistent set of methods, templates and techniques streamlines work, improves quality, and ensures compatibility amongst the work that each team member contributes. It is also desirable to promote and use standard, repeatable processes and procedures, which allows developers to learn how things are done, leads to predictable and high-quality results, and enables development to be consistent in the workflows that are developed. Once an effective workflow is developed, it is desirable that others use the workflow each time a similar requirement arises. When developers have figured out how to solve a common problem using certain processes, sequences or activities within a workflow, it is desirable to use that same solution as much as possible.

As best seen in FIG. 3, the robotic process automation platform may further include a help and support module 360 (hereinafter "the support module") to facilitate the creation and development of workflows. For example, support module 360 may include one or more configuration management databases that contain configuration data and/or files that have been stored in development database 114 and/or operational database 120. The configuration data and/or files that are stored in the configuration management databases may be files that are required to be used by a workflow in order to automated one or more processes within target application 124.

Support module 360 may also include a service knowledge management system that contains one or more layers that allow information to be processed as knowledge and made available to team members and other people in the organization through tools and databases, such as, for example, development database 114. One layer in the service knowledge management system is a presentation layer that provides access to the information, wherein developer computing device 116 and/or administrator computing device 118 are presented with a user interface and/or visual materials that allow for searching, browsing, and updating information stored within in the service knowledge management system. Service knowledge management system also allows for collaborating among developer computing devices 116 and/or administrator computing devices 118 to improve the knowledge base and allow for editing of such information as needed.

Another layer that may be included in the service knowledge management system is a knowledge processing layer that allows developer computing device 116 and/or administrator computing device 118 to report information that can be analyzed. Performance management is also a part of this layer and can be used to determine whether certain team members are meeting established performance goals. Performance scorecards can also be monitored in this layer to help improve the productivity of the development team.

Yet another layer that may be included in the service knowledge management system is an information integration layer that operates to integrate all of the information from relevant portions of the organization in one place. If your organization has partners, information related to these partners may also be included in this layer.

Service knowledge management system may also include a data integration layer that integrates the data that must be managed for a successful knowledge management process by managing applications, documents, and files. The data sources are found in this layer, as well as the tools team members can use to properly apply data as knowledge.

Robotics process automation platform may provide security in the form of using Lightweight Directory Access Protocol (LDAP) authentication, for example. LDAP is a protocol that allows for creating, editing and reading workflows, and tracks such actions by organized records such as employee id, employee name, and lists of employees with appropriate level of access. The current LDAP version supports simple authentication and security layer (SASL), which is an Internet standard responsible for allowing for the selection of a desired authentication protocols. In addition, LDAP supports transport layer security (TLS), which encrypts data that is communicated to the workflow. One benefit of LDAP is that it allows for use of one information directory containing relevant data. It also offers an access to the information directory from various services, such as email and web browsers among other services. Time savings is realized from offering one central information directory for various services.

Having described one embodiment of the robotics process automation platform and associated methods, an exemplary computer environment for implementing the robotics process automation platform is presented next.

Figure 14:
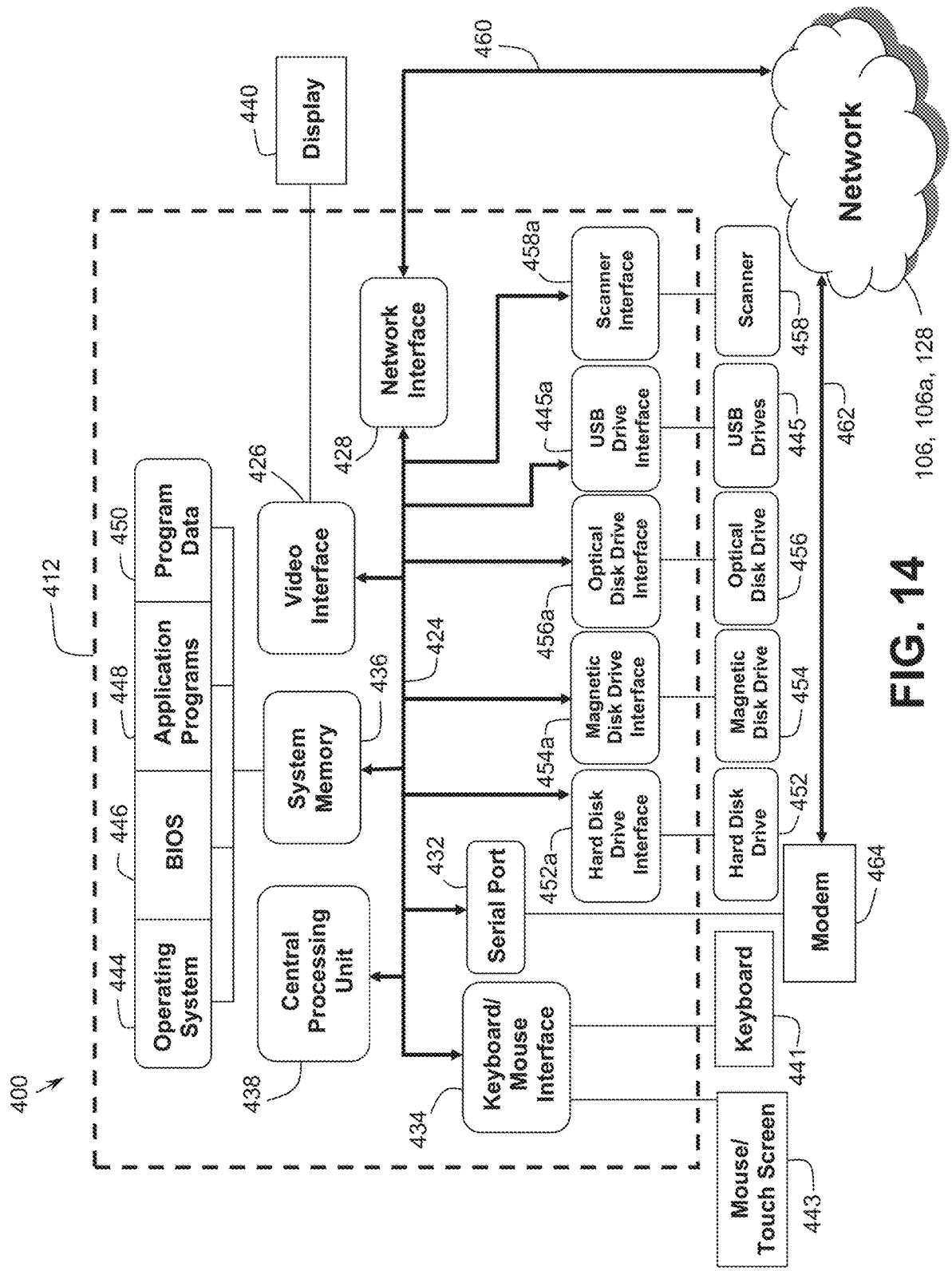
FIG. 14 is a schematic diagram generally illustrating a computing environment in which the robotics process automation platform may be implemented.

FIG. 14 shows an exemplary computing environment 400 that may be used to implement any of the processing of computer-executable instructions thus far described. Computing environment 400 may be a computer 412 that is representative of server 102, developer computing device 116, administrator computing device 118, project manager computing device 134, server 126, or remote computing device 280. For example, computer 412 may include a system bus 424 that couples a video interface 426, network interface 428, one or more serial ports 432, a keyboard/mouse interface 434, and a system memory 436 to a Central Processing Unit (CPU) 438. A monitor or display 440 is connected to bus 424 by video interface 426 and provides the user with a graphical user interface to create, view, edit, and provide input of data or content during the creation and development of a workflow, deploying, managing, or monitoring the workflow, for example. The graphical user interface allows the user to enter commands and information into computer 412 using a keyboard 441 and a user interface selection device 443, such as a mouse, touch screen or other pointing device. Keyboard 441 and user interface selection device are connected to bus 424 through keyboard/mouse interface 434. Display 440 and user interface selection device 443 are used in combination to form the graphical user interface which may allow the user to implement at least a portion of the processes described above with respect to the robotics process automation platform. Other peripheral devices may be connected to computer through serial port 432 or universal serial bus (USB) drives 445 to transfer information to and from computer 412.

The system memory 436 is also connected to bus 424 and may include read only memory (ROM), random access memory (RAM), an operating system 444, a basic input/output system (BIOS) 446, application programs 448 and program data 450. The computer 412 may further include a hard disk drive 452 for reading from and writing to a hard disk, a magnetic disk drive 454 for reading from and writing to a removable magnetic disk (e.g., floppy disk), and an optical disk drive 456 for reading from and writing to a removable optical disk (e.g., CD ROM or other optical media). The computer 412 may also include USB drives 445 and other types of drives for reading from and writing to flash memory devices (e.g., compact flash, memory stick/PRO and DUO, SD card, multimedia card, smart media xD card), and a scanner 458. A hard disk interface 452a, magnetic disk drive interface 454a, an optical drive interface 456a, a USB drive interface 445a, and a scanner interface 458a operate to connect bus 424 to hard disk drive 452, magnetic disk drive 454, optical disk drive 456, USB drive 445 and a scanner 458, respectively. Each of these drive components and their associated computer-readable media may provide computer 412 with non-volatile storage of computer-readable instruction, program modules, data structures, application programs, an operating system, and other data for the computer 412. In addition, it will be understood that computer 412 may also utilize other types of computer-readable media in addition to those types set forth herein, such as digital video disks, random access memory, read only memory, other types of flash memory cards, magnetic cassettes, and the like.

It should be understood that virtual computing device 104 may also include many of the components mentioned above with respect to FIG. 14, except for those components that are not typically associated with a cloud-based computing device. For example, virtual computing device 104 need not include video interface 426, keyboard/mouse interface 434, mouse/touchscreen 443, keyboard 441, scanner interface 458*a*, or scanner 458.

As mentioned above, the robotics process automation platform may be implemented in a networked environment using logical connections to establish communication between server 102, virtual computing device 104, developer computing device 116, administrator computing device 118, project manager computing device 134, server 126, and/or remote computing device 280, as previously described. Network interface 428 provides a communication path 460 between bus 424 and network 106, 106*a*, 128, which allows the instructions, data, sequences, files, designations, notifications, or information described above (for example, but not limited to, workflow, deployment instructions, workflow control instructions, workflow monitoring data, log information, configuration files, end point files, DLL files, project requirements, credential information, workflow scheduling instructions) to be communicated through network 106, 106*a*, 128 between server 102, virtual computing device 104, developer computing device 116, administrator computing device 118, project manager computing device 134, server 126, and/or remote computing device 280 using computer 412, as described above. This type of logical network connection is commonly used in conjunction with a local area network (LAN). The instructions, data, sequences, files, designations, notifications, or information may also be communicated from bus 424 through a communication path 462 to network 106, 106*a*, 128 using serial port 432 and a modem 464. Using a modem connection is commonly used in conjunction with a wide area network (WAN). It will be appreciated that the network connections shown herein are merely exemplary, and it is within the scope of the present invention to use other types of network connections between server 102, virtual computing device 104, developer computing device 116, administrator computing device 118, project manager computing device 134, server 126, and/or remote computing device 280 including both wired and wireless connections.

As can be appreciated, the robotic process automation platform and associated system and methods described above overcomes the previously mentioned drawbacks and deficiencies that currently exist in this field by providing a comprehensive solution for the creation, development, deployment, management and monitoring of workflows that are used to automated one or more processes in a target application. While the above-referenced platform, system and methods have been described with reference to an order processing system and methods, it should be understood that it is contemplated that the platform, system and methods be used to create, develop, deploy, manage and monitor workflows in any field, including, but not limited to, any type of data collection and processing fields, such as in medical and insurance record keeping, or other field that requires the use of a workflow to automate one or more processes within a target application.

From the foregoing, it will be seen that this invention is one well adapted to attain all the ends and objects hereinabove set forth together with other advantages which are obvious and which are inherent to the system and method. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement. Further, it should be understood that the use of the terms "module" and "component" herein are interchangeable and shall have the same meaning.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A system including a robotics process automation platform for developing and managing a workflow, the system comprising:

a) a server comprising a first memory and a first processor, wherein the first memory includes a development database and an operational database, and wherein the first processor is configured for executing computer-executable components stored in the first memory comprising:

a development interface component configured to allow for the creation of the workflow using the development interface component and storage of the workflow in the development database, wherein the workflow includes computer-executable instructions configured for automating at least one front end user-implemented process in a target application;

a control interface component configured for selecting the workflow stored in the development database and storing a copy of the workflow in the operational database; and b) a virtual computing device comprising a second memory and a second processor, wherein the second processor is configured for executing at least one computer-executable component stored in the second memory comprising:

a runner component configured for receiving instructions from the control interface component to store a copy of the workflow stored in the operational database in the second memory, wherein the runner component downloads the workflow stored in the operational database in the second memory, wherein the runner component is configured for instructing the second processor to execute the workflow that is stored in the second memory in association with the target application to automatically perform the at least one front end user-implemented process on a graphical user interface of the virtual computing device, and wherein the target application is stored in the second memory of the virtual computing device.

2. A system in accordance with claim 1, further comprising a network, wherein the server is in communication with the virtual computing device through the network.

3. A system in accordance with claim 1, further comprising:
 a network; and
 a developer computing device including a third memory and a third processor, wherein the developer computing device is in communication with the server over the network, wherein a copy of the development interface component is stored in the third memory and is implemented using the third processor.

4. A system in accordance with claim 1, wherein the development interface component is configured for editing the workflow, wherein the development interface component includes a version control component, wherein the version control component is configured for assigning a unique version identifier to the workflow when the workflow is edited and stored in the development database as a new version.

5. A system in accordance with claim 4, wherein the version control component is configured for identifying changes in content of the workflow that were made to the new version of the workflow stored in the development database relative to content of a previously stored version of the workflow.

6. A system in accordance with claim 4, wherein the version control component is configured for allowing at least a portion of the workflow to be tagged, wherein the tagged portion of the workflow is not able to be edited by the development interface component.

7. A system in accordance with claim 1, wherein the development interface component includes a dynamic link library manager that provides access to at least one dynamic link library stored in the development database, wherein the at least one dynamic link library provides instructions to perform a method or activity configured for use in the workflow.

8. A system in accordance with claim 7, wherein the dynamic link library manager is configured for allowing for the addition of one or more dynamic link libraries to the development database.

9. A system in accordance with claim 7, wherein the dynamic link library manager is configured for displaying the method or activity associated with the at least one dynamic link library.

10. A system in accordance with claim 1, wherein the development interface component includes a text parser component, wherein the text parser component is configured for capturing text included in a digital document provided by the target application.

11. A system in accordance with claim 10, wherein the text parser is configured for:
 allowing for the selection of a starting point within the digital document at a predetermined line and a predetermined character position within the predetermined line;
 allowing for the selection of a number of characters to be copied; and
 capturing the selected number of characters beginning at the starting point and storing the captured text in the second memory.

12. A system in accordance with claim 10, wherein the text parser is configured for:
 allowing for the selection of a starting point within the digital document at a predetermined line and a predetermined character position within the predetermined line;
 detecting the presence of one or more characters from the starting point;
 detecting a predetermined number of blank spaces following the detected one or more characters;
 upon detecting the predetermined number of blank spaces, detecting the presence of a character following the detected predetermined number of blank spaces; and
 upon detecting no character following the predetermined number of blank spaces, allowing for the capture of the one or more characters detected from the starting point in the second memory.

13. A system in accordance with claim 1, wherein the target application is a first target application that is configured for receiving input information from a remote computing device, wherein the workflow is configured for receiving the input information from the first target application, and wherein the workflow is configured for communicating output information to a second target application that is representative of the input information.

14. A system in accordance with claim 13, wherein the development interface component includes a verify value component, wherein the verify value component is configured for:
 copying the input information in the second memory;
 copying the output information in the second memory prior to the workflow communicating the output information to the second target application;
 comparing the input and output information stored in the second memory; and
 ceasing the execution of the workflow if the input and output information stored in the second memory do not match.

15. A system in accordance with claim 1, further comprising:
 a network; and
 at least one administrator computing device in communication with the server over the network, wherein the at least one remote administrator computing device is configured to utilize the control interface component.

16. A system in accordance with claim 1, wherein the control interface component is configured for instructing the runner component to start and stop the workflow from running on the second processor of the virtual computing device.

17. A system in accordance with claim 1, wherein the control interface component includes a credential manager component that allows for the association of target credential information with the workflow to provide access to the target application.

18. A system in accordance with claim 17, wherein the target credential information is encrypted, and wherein the target credential information is stored in the operational database.

19. A system in accordance with claim 17, further comprising:
 a network; and a remote computing device in communication with the credential manager component over the network, wherein the remote computing device is configured for inputting the credential information and storing the credential information in the operational database.

20. A system in accordance with claim 1, wherein the control interface component includes an environment manager component that provides the workflow with access to one or more of an end point file, a configuration file, or a dynamic link library file.

21. A system in accordance with claim 1, further comprising a user management component stored in the first memory, wherein the user management component is configured to provide access to at least one of the development interface component and the control interface component upon receipt of access information that matches authorized access information stored in at least one of the development database and the operational database.

22. A system in accordance with claim 21, wherein the authorized access information corresponds to an authorized user, and wherein the user management component is configured for assigning the authorized user to a program associated with the workflow.

23. A system in accordance with claim 1, wherein the runner component is configured for storing log information in the operational database, and wherein the log information is related to at least one of the execution of the workflow on the virtual computing device or the state of the virtual computing device.

24. A system in accordance with claim 23, further comprising a display, wherein the control interface component is configured for displaying the log information on the display.

25. A system in accordance with claim 1, wherein the computer-executable components stored in the first memory further include a requirement gathering interface component that is configured for allowing one or more files to be created, captured, and/or stored in a requirements database, wherein the requirements database is stored in the first memory, and wherein the one or more files are associated with the development of the workflow.

26. A system in accordance with claim 25, wherein the one or more files include data representative of at least one of a video, audio, digital photograph, or diagram.

27. A system in accordance with claim 26, wherein the diagram is at least one of a context diagram, functional decomposition diagram, use case diagram, sequence diagram, and current and future process model.

28. A system in accordance with claim 1, wherein the at least one front end user-implemented process includes at least one of the following:
   automated movement of a computer mouse pointer along at least one of an x-axis and a y-axis on the graphical user interface;
   automated clicking of a computer mouse;
   automated copying and pasting of text displayed on the graphical user interface;
   automated typing of text on the graphical user interface; or
   automated delay of between typing of characters on the graphical user interface.

29. A computer-implemented method for development and management of a workflow, wherein the workflow includes computer-executable instructions configured for automating at least one front end user-implemented process in a target application, utilizing at least one processor the method comprises the steps of:
   providing a development database and an operational database;
   creating a workflow and storing the workflow in the development database;
   selecting the workflow stored in the development database and storing a copy of the workflow in the operational database;
   communicating a copy of the workflow stored in the operational database to a virtual computing device; and
   executing the workflow on the virtual computing device in association with the target application to automatically perform the at least one front end user-implemented process on a graphical user interface of the virtual computing device, wherein the target application is stored in a memory of the virtual computing device.

30. A method in accordance with claim 29, further comprising the step of storing log information in the operational database, wherein the log information relates to at least one of the execution of the workflow on the virtual machine or the state of the virtual computing device.

31. A method in accordance with claim 29, further comprising the step of allowing for the start and stop of the workflow running on the virtual computing device using a remote computing device over a network.

32. A method in accordance with claim 29, further comprising the step of allowing for the association of credential information with the workflow to provide access to the target application.

33. A method in accordance with claim 32, further comprising the steps of encrypting the credential information and storing the encrypted credential information in the operational database.

34. A method in accordance with claim 29, further comprising the steps of allowing for the workflow to be edited, assigning a unique version identifier to the workflow when the workflow is edited and stored in the development database as a new version.

35. A method in accordance with claim 34, further comprising the step of identifying changes that were made to content of the new version of the workflow stored in the development database relative to content of a previously stored version of the workflow.

36. A method in accordance with claim 29, further comprising the step of tagging at least a portion of the workflow so that the tagged portion is not able to be edited.

37. A method in accordance with claim 29, further comprising the step of providing access to at least one dynamic link library stored in the development database, wherein the at least one dynamic link library provides instructions to perform a method or activity configured for use in the workflow.

38. A method in accordance with claim 37, further comprising the step of allowing for the addition of one or more dynamic link libraries to the development database.

39. A method in accordance with claim 29, further comprising the steps of:
   allowing for the selection of a starting point within a digital document provided by the target application at a predetermined line and a predetermined character position within the predetermined line;
   allowing for the selection of a number of characters to be copied; and
   capturing the selected number of characters beginning at the starting point and storing the captured text in a memory.

40. A method in accordance with claim 29, further comprising the steps of:
- allowing for the selection of a starting point within a digital document provided by the target application at a predetermined line and a predetermined character position within the predetermined line;
- detecting the presence of one or more characters from the starting point;
- detecting a predetermined number of blank spaces following the detected one or more characters;
- upon detecting the predetermined number of blank spaces, detecting the presence of a character following the detected predetermined number of blank spaces; and
- upon detecting no character following the predetermined number of blank spaces, allowing for the capture of the one or more characters detected from the starting point in a memory.

41. A method in accordance with claim 29, wherein the target application is a first application that is configured for receiving input information from a remote computing device, wherein the method further comprises the steps of:
- receiving the input information from the first target application; and
- communicating output information to a second target application component that is representative of the input information.

42. A method in accordance with claim 41, further comprising the steps of:
- copying the input information in the second memory;
- copying the output information in the second memory prior to the workflow communicating the output information to the second target application;
- comparing the input and output information stored in the second memory; and
- cease the execution of the workflow if the input and output information stored in the second memory do not match.

43. A non-transitory computer readable medium with instructions stored thereon, that when executed on a processor, perform the steps of:
- creating a workflow and storing the workflow in a development database, wherein the workflow includes computer-executable instructions configured for automating at least one front end user-implemented process in a target application;
- selecting the workflow stored in the development database and storing a copy of the workflow in an operational database;
- communicating a copy of the workflow stored in the operational database to a virtual computing device; and
- executing the workflow on the virtual computing device in association with the target application to automatically perform the at least one front end user-implemented process on a graphical user interface of the virtual computing device, wherein the target application is stored in a memory of the virtual computing device.

44. A robotics process automation platform for developing and managing a workflow in a computing environment, wherein the computing environment includes at least one processor and at least one first memory, and wherein the workflow includes computer-executable instructions configured for automating at least one front end user-implemented process in a target application, the platform comprising:
- a development database stored in the at least one first memory;
- an operational database stored in the at least one first memory;
- a development interface component including computer-executable instructions, executed on the at least one processor, configured for creating a workflow and storing the workflow in the development database;
- a control interface component including computer-executable instructions, executed on the at least one processor, configured for selecting the workflow stored in the development database and storing a copy of the workflow in the operational database; and
- a runner component including computer-executable instructions, executed on the at least one processor, configured for receiving instructions from the control interface component to store a copy of the workflow stored in the operational database in a second memory of a virtual computing device, wherein the runner component is configured for downloading the workflow stored in the operational database in the second memory of the virtual computing device, and wherein the runner component is configured for instructing the virtual computing device to execute the workflow in association with the target application to automatically perform the at least one front end user-implemented process on a graphical user interface of the virtual computing device, and wherein the target application is stored in the second memory of the virtual computing device.

45. A system including a robotics process automation platform for developing and managing a workflow, the system comprising:
- a) a server comprising a first memory and a first processor, wherein the first memory includes a development database and an operational database, and wherein the first processor is configured for executing computer-executable components stored in the first memory comprising:
  - a development interface component configured to allow for the creation of the workflow and storage of the workflow in the development database, wherein the workflow includes computer-executable instructions configured for performing at least one automated process in a target application;
  - a control interface component configured for selecting the workflow stored in the development database and storing a copy of the workflow in the operational database; and
- b) a virtual computing device comprising a second memory and a second processor, wherein the second memory includes random access memory (RAM), and wherein the second processor is configured for executing at least one computer-executable component stored in the second memory comprising:
  - a runner component configured for receiving instructions from the control interface component to store a copy of the workflow stored in the operational database in the second memory, wherein the runner component downloads the workflow stored in the operational database in the second memory, and wherein the runner component is configured for instructing the second processor to execute the workflow that is stored in the second memory in association with the target application;
  - wherein the runner component includes a memory management module, wherein the memory management module is configured for automatically managing utilization of the second memory of the virtual computing device, wherein the memory management module includes a live optimization module that is configured for:

detecting active application programs that are stored in the RAM of the second memory; and determining the amount of RAM of the second memory being utilized by the active application programs, wherein when the active application programs are utilizing greater than or equal to a predetermined RAM threshold, the live optimization module is configured to force restart the virtual computing device prior to the runner component instructing the second processor to execute the workflow.

* * * * *